(12) United States Patent
Bhattacharya et al.

(10) Patent No.: US 8,124,676 B2
(45) Date of Patent: *Feb. 28, 2012

(54) BASECOAT COATING COMPOSITIONS COMPRISING LOW MOLECULAR WEIGHT CELLULOSE MIXED ESTERS

(75) Inventors: Deepanjan Bhattacharya, Kingsport, TN (US); Roy Glenn Foulk, Kingsport, TN (US); Hampton Loyd Chip Williams, III, Kingsport, TN (US); Michael Charles Shelton, Kingsport, TN (US); Jessica Dee Posey-Dowty, Kingsport, TN (US); Luis Guillermo Rios Perdomo, Kingsport, TN (US); Daniel Wayne Dixon, Jr., Church Hill, TN (US); Paul Lee Lucas, Gray, TN (US); Alan Kent Wilson, Kingsport, TN (US); Kenneth Raymond Walker, Dunblane (GB); Jonathan Edward Lawniczak, Kingsport, TN (US); Hieu Duy Phan, Antioch, IL (US); Charlie Carroll Freeman, Jr., Grundy, VA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,744

(22) Filed: Sep. 15, 2009

(65) Prior Publication Data

US 2010/0152336 A1 Jun. 17, 2010

Related U.S. Application Data

(60) Continuation-in-part of application No. 12/510,325, filed on Jul. 28, 2009, which is a division of application No. 10/796,176, filed on Mar. 9, 2004, now Pat. No. 7,585,905.

(60) Provisional application No. 60/455,033, filed on Mar. 14, 2003, provisional application No. 61/097,020, filed on Sep. 15, 2008.

(51) Int. Cl.
C08L 1/00 (2006.01)
C08L 1/14 (2006.01)
C08L 1/12 (2006.01)
(52) U.S. Cl. .............. 524/35; 524/38; 524/39
(58) Field of Classification Search ............... 536/66, 536/58; 524/35, 38, 430; 522/88
See application file for complete search history.

(56) References Cited

U.S. PATENT DOCUMENTS

| | | | |
|---|---|---|---|
| 1,652,573 A | 12/1927 | Mallabar | |
| 1,683,347 A | 9/1928 | Gray et al. | |
| 1,878,954 A | 9/1932 | Malm | |
| 2,129,052 A | 9/1938 | Fordyce | |
| 2,801,239 A | 7/1957 | Hiatt et al. | |
| 3,281,267 A | 10/1966 | Rice | |
| 3,386,932 A | 6/1968 | Steinmann | |
| 3,391,135 A | 7/1968 | Ouno et al. | |
| 3,411,941 A | 11/1968 | Lowe et al. | |
| 3,429,840 A | 2/1969 | Lowe et al. | |
| 3,518,249 A | 6/1970 | Hiatt et al. | |
| 3,850,770 A | 11/1974 | Juna et al. | |
| T941,001 I4 | 12/1975 | Corpening et al. | |
| 3,998,768 A | 12/1976 | Pettit | |
| 4,007,144 A | 2/1977 | Sanders et al. | |
| 4,134,809 A | 1/1979 | Pacifici et al. | |
| 4,170,663 A | 10/1979 | Hahn et al. | |
| 4,389,502 A | 6/1983 | Fry et al. | |
| 4,407,990 A | 10/1983 | Hall et al. | |
| 4,408,028 A | 10/1983 | Nakayama et al. | |
| 4,415,734 A | 11/1983 | Yabune et al. | |
| 4,442,145 A | 4/1984 | Probst et al. | |
| 4,532,177 A | 7/1985 | Mahar | |
| 4,543,409 A | 9/1985 | Diamantoglou et al. | |
| 4,551,491 A | 11/1985 | Panush | |
| 4,551,492 A | 11/1985 | Aerts | |
| 4,565,730 A | 1/1986 | Poth et al. | |
| 4,590,265 A | 5/1986 | Bogan et al. | |
| 4,595,722 A | 6/1986 | Such | |
| 4,598,015 A | 7/1986 | Panush | |
| 4,598,020 A | 7/1986 | Panush | |
| 4,598,111 A | 7/1986 | Wright et al. | |
| 4,603,160 A | 7/1986 | Leonard | |
| 4,605,687 A | 8/1986 | Panush | |
| 4,650,821 A | 3/1987 | Leonard | |

(Continued)

FOREIGN PATENT DOCUMENTS

EP 0 267 409 B1 5/1988

(Continued)

OTHER PUBLICATIONS

USPTO Notice of Allowance dated Apr. 20, 2011 for copending U.S. Appl. No. 12/510,324.

(Continued)

*Primary Examiner* — James J Seidleck
*Assistant Examiner* — Saira B Haider
(74) *Attorney, Agent, or Firm* — Polly C. Owen; Bernard J. Graves, Jr.

(57) ABSTRACT

A basecoat composition is provided comprising: a) at least one film-forming polymer selected from the group consisting of acrylic polyols and polyester polyols; b) at least one rheological modifier; c) at least one solvent; d) at least one pigment; e) optionally, at least one microgel; f) optionally, at least one crosslinking agent; and g) at least one cellulose mixed ester. A wet-on-wet-on wet process is also provided. The process for coating a substrate comprises: a) applying a primer to said substrate to produce a primed substrate; b) applying a basecoat composition to said primed substrate while said primer is wet to produce a basecoated substrate; and c) applying a clearcoat composition to said basecoated substrate while said basecoat composition is wet and optionally said primer is wet to produce a coated substrate. Coated articles are also provided.

15 Claims, 1 Drawing Sheet

U.S. PATENT DOCUMENTS

| | | |
|---|---|---|
| 4,692,481 A | 9/1987 | Kelly |
| 4,707,381 A | 11/1987 | Toyama et al. |
| 4,714,634 A | 12/1987 | Miyazono et al. |
| 4,725,640 A | 2/1988 | Cowles |
| 4,732,790 A | 3/1988 | Blackburn et al. |
| 4,732,791 A | 3/1988 | Blackburn et al. |
| 4,740,541 A | 4/1988 | Morse |
| 4,753,829 A | 6/1988 | Panush |
| 4,755,581 A | 7/1988 | Blackburn et al. |
| 4,755,582 A | 7/1988 | Blackburn et al. |
| 4,829,108 A | 5/1989 | Okuda et al. |
| 4,855,184 A | 8/1989 | Klun et al. |
| 4,859,758 A | 8/1989 | Shalati et al. |
| 4,888,372 A | 12/1989 | Abrams et al. |
| 4,902,578 A | 2/1990 | Kerr, III |
| 4,970,247 A | 11/1990 | Hoppe et al. |
| 4,975,300 A | 12/1990 | Deviny |
| 4,983,730 A | 1/1991 | Domeshek et al. |
| 5,051,473 A | 9/1991 | Tabuchi et al. |
| 5,086,144 A | 2/1992 | Shalati et al. |
| 5,089,313 A | 2/1992 | Cope |
| 5,091,010 A | 2/1992 | Souma et al. |
| 5,256,453 A | 10/1993 | Heithorn et al. |
| 5,260,358 A | 11/1993 | Shimuzu et al. |
| 5,283,126 A | 2/1994 | Rasmussen et al. |
| 5,292,783 A * | 3/1994 | Buchanan et al. ............... 524/37 |
| 5,321,063 A | 6/1994 | Shimada et al. |
| 5,322,560 A | 6/1994 | DePue et al. |
| 5,360,644 A | 11/1994 | Briggs et al. |
| 5,372,638 A | 12/1994 | DePue et al. |
| 5,384,163 A | 1/1995 | Budde et al. |
| 5,389,139 A | 2/1995 | Carpenter et al. |
| 5,418,293 A | 5/1995 | Numa et al. |
| 5,425,969 A | 6/1995 | Wakabayashi et al. |
| 5,449,555 A | 9/1995 | Karstens et al. |
| 5,473,032 A | 12/1995 | Bederke et al. |
| 5,478,386 A | 12/1995 | Itoh et al. |
| 5,480,922 A | 1/1996 | Mülhaupt et al. |
| 5,498,663 A | 3/1996 | Shimada et al. |
| 5,498,781 A | 3/1996 | Hall et al. |
| 5,504,178 A | 4/1996 | Shaffer et al. |
| 5,510,443 A | 4/1996 | Shaffer et al. |
| 5,520,963 A | 5/1996 | Liu |
| 5,527,848 A | 6/1996 | Carpenter et al. |
| 5,545,677 A | 8/1996 | Hall et al. |
| 5,552,458 A | 9/1996 | Hall et al. |
| 5,580,819 A | 12/1996 | Li et al. |
| 5,585,186 A | 12/1996 | Scholz et al. |
| 5,624,757 A | 4/1997 | Smith |
| 5,658,976 A | 8/1997 | Carpenter et al. |
| 5,663,310 A | 9/1997 | Shimoda et al. |
| 5,668,273 A | 9/1997 | Allen et al. |
| 5,670,141 A | 9/1997 | Nebra |
| 5,705,632 A | 1/1998 | Shimoda et al. |
| 5,720,803 A | 2/1998 | Itoh et al. |
| 5,721,015 A | 2/1998 | Iwamura et al. |
| 5,741,880 A | 4/1998 | Valpey et al. |
| 5,744,243 A | 4/1998 | Li et al. |
| 5,753,373 A | 5/1998 | Scholz et al. |
| 5,759,631 A | 6/1998 | Rink et al. |
| 5,821,315 A | 10/1998 | Moriya et al. |
| 5,856,468 A | 1/1999 | Shuto et al. |
| 5,873,931 A | 2/1999 | Scholz et al. |
| 5,914,309 A | 6/1999 | Ulbl et al. |
| 5,914,397 A | 6/1999 | Kiyose et al. |
| 5,919,920 A | 7/1999 | Murakami et al. |
| 5,942,030 A | 8/1999 | Schuhmacher et al. |
| 5,962,677 A | 10/1999 | Murakami et al. |
| 5,990,304 A | 11/1999 | Kiyose et al. |
| 5,993,526 A | 11/1999 | Sommer et al. |
| 5,994,530 A | 11/1999 | Posey-Dowty et al. |
| 5,997,621 A | 12/1999 | Scholz et al. |
| 5,998,035 A | 12/1999 | Iwamura et al. |
| 6,001,484 A | 12/1999 | Horrion et al. |
| 6,001,931 A | 12/1999 | Brahm et al. |
| 6,025,433 A | 2/2000 | Shibatoh et al. |
| 6,040,053 A | 3/2000 | Scholz et al. |
| 6,046,259 A | 4/2000 | Das et al. |
| 6,051,242 A | 4/2000 | Patel et al. |
| 6,099,973 A | 8/2000 | Miyai et al. |
| 6,207,601 B1 | 3/2001 | Maurer et al. |
| 6,218,448 B1 | 4/2001 | Kraaijevanger et al. |
| 6,225,404 B1 | 5/2001 | Sorensen et al. |
| 6,228,433 B1 | 5/2001 | Witt |
| 6,261,642 B1 | 7/2001 | Nagai et al. |
| 6,303,670 B1 | 10/2001 | Fujino et al. |
| 6,313,202 B1 | 11/2001 | Buchanan et al. |
| 6,331,326 B1 | 12/2001 | Tsunoda et al. |
| 6,355,303 B1 | 3/2002 | Vogt-Birnbrich et al. |
| 6,403,152 B1 | 6/2002 | Puligadda et al. |
| 6,407,151 B1 | 6/2002 | Hoppe et al. |
| 6,407,224 B1 | 6/2002 | Mironov et al. |
| 6,509,440 B1 | 1/2003 | Sakane et al. |
| 6,512,044 B1 | 1/2003 | Wilke |
| 6,522,812 B1 | 2/2003 | Nikonov |
| 6,544,593 B1 | 4/2003 | Nagata et al. |
| 6,592,944 B1 | 7/2003 | Uhlianuk et al. |
| 6,596,069 B2 | 7/2003 | Ido et al. |
| 6,607,833 B1 | 8/2003 | Uhlianuk et al. |
| 6,609,677 B2 | 8/2003 | Seybold et al. |
| 6,632,852 B1 | 10/2003 | Chen et al. |
| 6,635,314 B1 | 10/2003 | William et al. |
| 6,653,411 B2 | 11/2003 | Puligadda et al. |
| 6,656,983 B1 | 12/2003 | Mayer et al. |
| 6,689,839 B1 | 2/2004 | Hayakawa et al. |
| 6,696,142 B2 | 2/2004 | Baer et al. |
| 6,758,992 B2 | 7/2004 | Solomon et al. |
| 6,861,495 B2 | 3/2005 | Barsotti et al. |
| 6,870,024 B2 | 3/2005 | Haubennestel et al. |
| 6,903,145 B2 | 6/2005 | Nienhaus et al. |
| 6,913,831 B2 | 7/2005 | Suzuki |
| 6,930,161 B2 * | 8/2005 | Schwarte et al. ............... 528/45 |
| 6,987,144 B2 | 1/2006 | Anderson et al. |
| 6,997,980 B2 | 2/2006 | Wegner et al. |
| 7,001,948 B2 | 2/2006 | Gupta et al. |
| 7,026,470 B2 | 4/2006 | Obie |
| 7,208,534 B2 | 4/2007 | Van Rooyen |
| 7,585,905 B2 | 9/2009 | Shelton et al. |
| 2002/0197411 A1 | 12/2002 | Colyer et al. |
| 2003/0059547 A1 | 3/2003 | Rihan et al. |
| 2003/0161961 A1 | 8/2003 | Barsotti et al. |
| 2003/0212171 A1 | 11/2003 | Frederick et al. |
| 2004/0058083 A1 | 3/2004 | Lettmann et al. |
| 2004/0101629 A1 | 5/2004 | Baumgart et al. |
| 2004/0110895 A1 | 6/2004 | Anderson et al. |
| 2004/0180993 A1 | 9/2004 | Shelton et al. |
| 2004/0181009 A1 | 9/2004 | Shelton et al. |
| 2004/0185269 A1 | 9/2004 | Loper et al. |
| 2005/0031873 A1 | 2/2005 | Berschel et al. |
| 2005/0100740 A1 | 5/2005 | Lin et al. |
| 2005/0123781 A1 | 6/2005 | Drescher et al. |
| 2005/0132781 A1 | 6/2005 | Seo et al. |
| 2005/0186349 A1 | 8/2005 | Loper et al. |
| 2005/0203278 A1 | 9/2005 | McCreight et al. |
| 2005/0227162 A1 | 10/2005 | Van Rooyen |
| 2006/0052525 A1 | 3/2006 | Staunton et al. |
| 2006/0100353 A1 | 5/2006 | Barsotti et al. |
| 2006/0123890 A1 | 6/2006 | Seo et al. |
| 2007/0028806 A1 | 2/2007 | Piro et al. |
| 2007/0088105 A1 | 4/2007 | Shelton et al. |
| 2007/0282038 A1 | 12/2007 | Bhattacharya et al. |
| 2008/0032067 A1 | 2/2008 | Sakurazawa et al. |
| 2008/0069963 A1 | 3/2008 | Bhattacharya et al. |
| 2008/0085953 A1 | 4/2008 | Bhattacharya et al. |
| 2008/0090960 A1 | 4/2008 | Bhattacharya et al. |

FOREIGN PATENT DOCUMENTS

| | | |
|---|---|---|
| EP | 0 289 997 A2 | 11/1988 |
| EP | 0 515 208 A3 | 11/1992 |
| EP | 0 547 614 A3 | 6/1993 |
| EP | 0 455 211 B2 | 4/1995 |
| EP | 0 803 552 B2 | 5/2000 |
| EP | 1 574 554 A3 | 9/2005 |
| FR | 2 244 572 | 4/1975 |
| GB | 1 122 006 | 7/1968 |
| JP | 51-119088 | 10/1976 |
| JP | 51-119089 | 10/1976 |

| JP | 59-152901 | | 8/1984 |
|---|---|---|---|
| JP | 11-035601 | | 2/1999 |
| WO | WO 82/02719 | | 8/1982 |
| WO | WO 91/16356 | | 10/1991 |
| WO | WO 96/20961 | | 7/1996 |
| WO | WO 98/33821 | A1 | 8/1998 |
| WO | WO 99/59753 | | 11/1999 |
| WO | WO 01/35719 | | 5/2001 |
| WO | WO 0236637 | A1 | 5/2002 |
| WO | WO 03/070843 | A1 | 8/2003 |
| WO | WO 2004/083253 | A1 | 9/2004 |
| WO | WO 2004/094515 | A1 | 11/2004 |
| WO | WO 2006/116367 | A1 | 11/2006 |
| WO | WO 2007/005808 | A2 | 1/2007 |
| WO | WO 2007/145929 | A2 | 12/2007 |
| WO | WO 2008/036274 | A1 | 3/2008 |

OTHER PUBLICATIONS

USPTO Notice of Allowance dated Jun. 8, 2011 for copending U.S. Appl. No. 11/394,008.
Kirk-Othmer, Encyclopedia of Chemical Technology, Fourth Ed., vol. 5, pp. 496-529, 509 (1993), John Wiley & Sons, New York, New York.
Nishimura, T.; Nakatsubo, F. "Chemical Synthesis of Cellulose Derivatives by a Convergent Synthetic Method and Several of Their Properites," Cellulose, 1997, 4, 109.
Kawada, T.; Nakatsubo, F.; Murakami, K.; Sakuno, T. "Synthetic Studies of Cellulose IX: Reactivity and Cleavage of Three Kinds of Protective Groups of Synthesized Celloologosaccharide Derivatives," Mokuzai Gakkaishi, 1991, 37 (10), 930.
Kawada, T.; Nakatsubo, F.; Umezawa, T.; Murakami, K.; Sakuno, T. "Synthetic Studies of Cellulose XII: First Chemical Synthesis of Cellooctaose Acetate," Mokuzai Gakkaishi, 1994, 40 (7), 738.
"Characterization of Cellulose Esters by Solution-State and Solid-State Nuclear Magnetic Resonance Spectroscopy," Editors: T. J. Heinze and W. G. Glasser, Chapter 10 in the ACS Symposium Series 688 :Cellulose Derivatives—Modification, Characterization, and Nanostructures, Douglas W. Lowman, 131-162 (1998).
Miyamoto, T.; Sato, Y.; Shibata, T.; Inagaki, H.; Tanahashi, M; *J. Polym. Sci., Polym. Chem. Ed.*, 1984, 22, 2363.
Malm, Carl J.; Fordyce, Charles R.; Tanner, Howard A. "Properties of Cellulose Esters of Acetic, Propionic, and Butyric Acids," *Ind. Eng. Chem.*, 1942, 34(4), 430.
Abatzoglou, N.; Chornet, E. "Acid Hydrolysis of Hemicelluloses and Cellulose: Theory and Applications," in *Polysaccharides: Structural Diversity and Functional Versatility*, ed. S. Dumitriu, Marcel Dekker, Inc., New York, 1998.
Buchanan, C. M.; Hyatt, J. A.; Kelley, S. S.; Little, J. L.; *Macromolecules*, 1990, 23, 3747.
Dickey, E. E.; Wolfrom, J. L., A Polymer-Homologous Series of Sugar Acetates from the Acetolysis of Cellulose,: *J. Am. Chem. Soc.*, 1949, 825.
Wolfrom, M. L.; Dacons, J. C., "The Polymer-Homologous Series of Oligosaccharides from Cellulose," *J. Am. Chem. Soc.*, 1952, 5331.
Research Disclosure, Sep. 1978, 17304, p. 19.
International Search Report and Written Opinion of the International Searching Authority for Corresponding PCT/US2006/015573.
Copending U.S. Appl. No. 11/810,011, filed Jun. 4, 2007.
Copending U.S. Appl. No. 11/856,176, filed Sep. 17, 2007.
Copending U.S. Appl. No. 11/845,179, filed Sep. 17, 2007.
Office Action dated May 16, 2007 from United States Patent and Trademark Office for co-pending U.S. Appl. No. 10/796,176.
Office Action dated May 16, 2007 from United States Patent and Trademark Office for co-pending U.S. Appl. No. 10/796,235.
PCT International Search Report and Written Opinion With Date of Mailing Jan. 7, 2007 for Related PCT/US2007/013253 Application.
PCT International Search Report and Written Opinion with Date of Mailing Feb. 6, 2008 for Related PCT/US2007/013212 Application.
Office Action dated Jan. 17, 2008 from United States Patent and Trademark Office for co-pending U.S. Appl. No. 10/796,235.
Office Action dated Jan. 25, 2008 from United States Patent and Trademark Office for co-pending U.S. Appl. No. 10/796,176.
PCT International Search Report and Written Opinion with Date of Mailing Mar. 3, 2008 for Related PCT/US2007/020219 Application.
Office Action dated Mar. 28, 2008 from United States Patent and Trademark Office for co-pending U.S. Appl. No. 11/810,011.
PCT International Search Report and Written Opinion with Date of Mailing Jul. 28, 2008 for Related PCT/US2007/020224 Application.
Office Action from the United States Patent and Trademark Office with Mail Date of Sep. 30, 2008 for 10/796,235.
Office Action from the United States Patent and Trademark Office with Mail Date of Apr. 2, 2009 for 11/394,008.
PCT International Search Report and Written Opinion with Date of Mailing Jan. 8, 2010 for Related PCT/US2009/005144 Application.
USPTO Notice of Allowance dated Jun. 1, 2009 for U.S. Appl. No. 10/796,176.
Office Action from the United States Patent and Trademark Office with Mail Date of May 26, 2009 for U.S. Appl. No. 10/796,235.
Office Action from the United States Patent and Trademark Office with Mail Date of Jan. 22, 2010 for U.S. Appl. No. 11/394,008.
Copending U.S. Appl. No. 12/510,324 filed Jul. 28, 2009, Michael Charles Shelton, et al.
Copending U.S. Appl. No. 12/559,744 filed Sep. 15, 2009, Deepanjan Bhattacharya, et al.
Copending U.S. Appl. No. 12/728,427, filed Mar. 22, 2010, Michael Charles Shelton, et al.
USPTO Office Action dated Apr. 9, 2008 for copending U.S. Appl. No. 11/810,065.
PCT International Search Report and Written Opinion With Date of Mailing Jun. 22, 2010 for Related PCT/US2010/000839 Application.
USPTO Office Action dated Aug. 4, 2010 for copending U.S. Appl. No. 11/394,008.
USPTO Notice of Allowance dated Oct. 7, 2010 for copending U.S. Appl. No. 10/796,235.
USPTO Office Action dated Oct. 7, 2010 for copending U.S. Appl. No. 12/510,324.
USPTO Office Action dated Oct. 8, 2010 for copending U.S. Appl. No. 12/559,744.
USPTO Office Action dated Oct. 12, 2011 for copending U.S Appl. No. 12/728,427.

\* cited by examiner

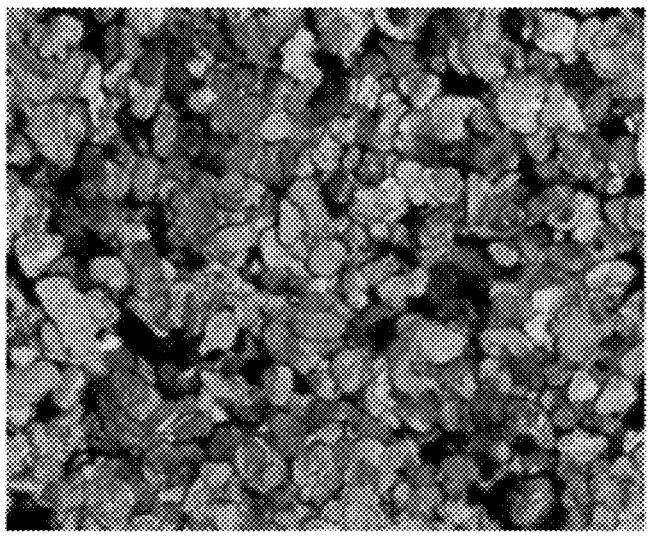
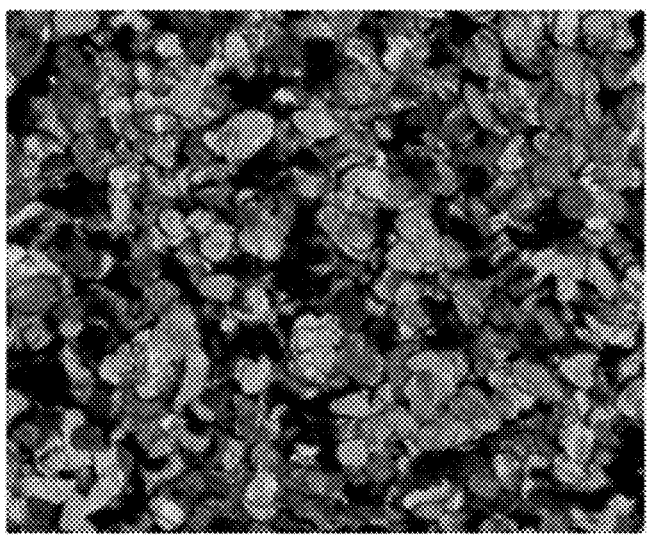
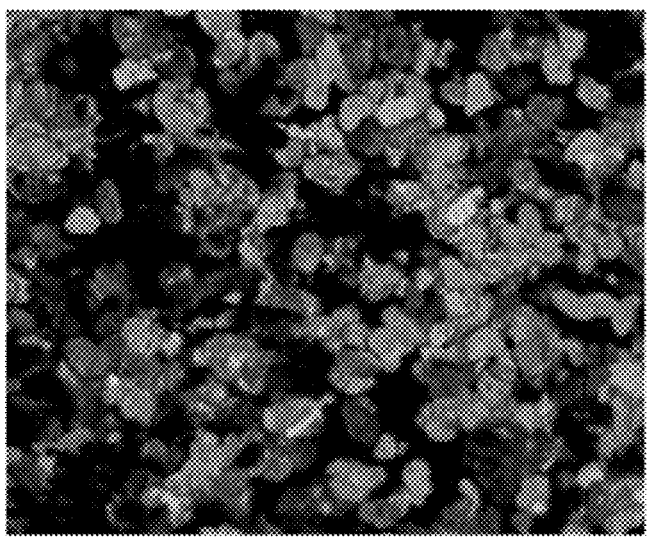

BASECOAT COATING COMPOSITIONS COMPRISING LOW MOLECULAR WEIGHT CELLULOSE MIXED ESTERS

RELATED APPLICATIONS

This application is a continuation in part application of U.S. Divisional application Ser. No. 12/510,325, which claims priority to U.S. Divisional application Ser. No. 12/510,325, filed Jul. 28, 2009, which claims priority to U.S. Non-Provisional application Ser. No. 10/796,176 filed on Mar. 9, 2004 and issued as U.S. Pat. No. 7,585,905, which claims priority to U.S. Provisional Application 60/455,033 filed on Mar. 14, 2003; and it also claims priority to U.S. Provisional Application Ser. No. 61/097,020 filed Sep. 15, 2008, the disclosures of which are herein incorporated by reference in their entirety to the extent they do not contradict the statements herein.

FIELD OF THE INVENTION

This invention belongs to the field of cellulose chemistry, and more particularly, to low molecular weight cellulose mixed esters that are useful in coating and ink compositions as low viscosity binder resins and rheology modifiers. More particularly, this invention relates to the use of low molecular weight cellulose mixed esters in basecoat compositions.

BACKGROUND OF THE INVENTION

Cellulose esters are valuable polymers that are useful in many plastic, film, coating, and fiber applications. Cellulose esters (CEs) are typically synthesized by the reaction of cellulose with an anhydride or anhydrides corresponding to the desired ester group or groups, using the corresponding carboxylic acid as diluent and product solvent. Some of these ester groups can afterward be hydrolyzed to obtain a partially-esterified product. These partially substituted cellulose esters have great commercial value, and find use in coatings, where their greater solubility and compatibility with co-resins (in comparison with triesters) and hydroxyl group content (to facilitate crosslinking) are prized.

Paint manufacturers, especially automotive original equipment manufacturers (OEM) strive to gain competitive advantage over each other by focusing on improving the overall appearance. Exterior color and overall appearance can play a major role in influencing the buying process of OEM end users. On the other hand, environmental legislation across the globe has resulted in the paint industry attempting to move towards greener and more 'eco-friendly' products with similar performance attributes as conventional coating formulations. Increases in the total solids content or a replacement of certain organic solvents by water are two alternatives available to the coating suppliers to limit the amount of volatile organic compounds (VOC) in the paint formulation. OEM producers that use high-solids basecoat technology want to compete in terms of color brightness and overall aesthetics with those using waterborne basecoat technologies.

Waterborne basecoats are typically applied at 20-25% total solids, which is much lower than the non-volatile content of solvent borne high-solids (HS) coatings. Therefore, HS solvent borne basecoat technology is challenged in terms of the film shrinkage that it can bring when compared to waterborne systems. Lower film shrinkage in the case of HS basecoats leads to poorer alignment of metal flakes and reduced metallic travel. An unmet need exists for a solution that can enable OEM producers using solvent borne technology to develop basecoats with brighter colors and improved overall appearance. This invention provides for the use of low molecular weight cellulose mixed esters, which provides excellent appearance properties in high solids OEM basecoat applications. In one embodiment of the invention, the low molecular weight cellulose ester has a 29% butyryl (Bu) and a 1.5% OH content. The relatively high Tg of about 110° C. coupled with the low butyryl content enables the low molecular weight cellulose ester to provide performance benefits very similar to commercial CABs without causing a detrimental effect on the VOC levels.

Any substrate material can be coated with the basecoat composition according to the present invention. These include surfaces, such as, but not limited to, glass, ceramic, paper, wood and plastic. The basecoat composition of the present invention is particularly adapted for metal substrates and specifically for use in a basecoat application. The basecoat composition may be applied using conventional spray equipment such as air-atomized guns or electrostatic bell applicators.

SUMMARY OF THE INVENTION

In one embodiment of this invention, a basecoat composition is provided comprising: a) at least one film-forming polymer selected from the group consisting of acrylic polyols and polyester polyols; b) at least one rheological modifier; c) at least one solvent; d) at least one pigment; e) optionally, at least one microgel; f) optionally, at least one crosslinking agent; and g) at least one cellulose mixed ester selected from:

(1) a cellulose mixed ester having:
   a total degree of substitution per anhydroglucose unit of from about 3.08 to about 3.50, having the following substitutions:
     a degree of substitution per anhydroglucose unit of hydroxyl of no more than about 0.70,
     a degree of substitution per anhydroglucose unit of $C_3$-$C_4$ esters from about 0.80 to about 1.40, and
     a degree of substitution per anhydroglucose unit of acetyl of from about 1.20 to about 2.34;
   an inherent viscosity of from about 0.05 to about 0.15 dL/g, as measured in a 60/40 (wt./wt.) solution of phenol/tetrachloroethane at 25° C.;
   a number average molecular weight ($M_n$) of from about 1,000 to about 5,600;
   a weight average molecular weight ($M_w$) of from about 1,500 to about 10,000; and
   a polydispersity of from about 1.2 to about 3.5;

(2) a cellulose mixed ester having:
   a total degree of substitution per anhydroglucose unit of from about 3.08 to about 3.50, having the following substitutions:
     a degree of substitution per anhydroglucose unit of hydroxyl of no more than about 0.70;
     a degree of substitution per anhydroglucose unit of $C_3$-$C_4$ esters from about 1.40 to about 2.45, and
     a degree of substitution per anhydroglucose unit of acetyl of from about 0.20 to about 0.80;
   an inherent viscosity of from about 0.05 to about 0.15 dL/g, as measured in a 60/40 (wt./wt.) solution of phenol/tetrachloroethane at 25° C.;
   a number average molecular weight ($M_n$) of from about 1,000 to about 5,600;
   a weight average molecular weight ($M_w$) of from about 1,500 to about 10,000; and
   a polydispersity of from about 1.2 to about 3, and (3) a cellulose mixed ester having:
  a total degree of substitution per anhydroglucose unit of from about 3.08 to about 3.50, having the following substitutions:
    a degree of substitution per anhydroglucose unit of hydroxyl of no more than about 0.70;
    a degree of substitution per anhydroglucose unit of $C_3$-$C_4$ esters from about 1.40 to about 2.45, and
    a degree of substitution per anhydroglucose unit of acetyl of from about 0.20 to about 0.80;
  an inherent viscosity of from about 0.05 to about 0.15 dL/g, as measured in a 60/40 (wt./wt.) solution of phenol/tetrachloroethane at 25° C.;
  a number average molecular weight ($M_n$) of from about 1,000 to about 5,600;
  a weight average molecular weight ($M_w$) of from about 1,500 to about 10,000; and
  a polydispersity of from about 1.2 to about 3.5;
  and mixtures of said cellulose mixed esters.

Basecoat Composition

The cellulose mixed esters utilized in the basecoat compositions according to the present invention are low in molecular weight, have a high maximum degree of substitution (are highly substitutable), and provide high solids, low viscosity coating compositions, with none of the drawbacks typically associated with low molecular weight cellulose esters, such as formation of brittle films. When used as coating additives in combination with one or more resins, the inventive esters do not themselves unduly increase the viscosity of the compositions, providing the advantages of conventional cellulose esters without the drawbacks typically associated with their use, such as an undesirable increase in organic solvent levels to maintain the desired viscosity.

The cellulose mixed esters utilized in the basecoat compositions of this invention have a high maximum degree of substitution (DS) per anhydroglucose unit on the cellulose backbone in the fully esterified or partially hydrolyzed form, and generally have a DS for hydroxyl groups of less than about 0.70 (<0.70 DS hydroxyl). The maximum degree of substitution per anhydroglucose unit for the cellulose mixed esters of this invention is from about 3.08 to about 3.50. These cellulose mixed esters are soluble in a wide range of organic solvents, allowing coatings formulators a wide latitude of solvent choice. They have a minimal impact on both the solution and spray viscosities of high solids solvent-borne coatings. These materials exhibit superior compatibility when blended with other coating resins, thereby yielding clear films with a wider range of coatings resins than do conventional cellulose esters.

In another embodiment of this invention, a process of coating a substrate is provided comprising applying at least one primer layer, at least one basecoat composition layer, and at least one clearcoat layer to a substrate; wherein the basecoat composition layer is applied when the primer layer is wet; wherein the basecoat composition layer comprises a basecoat composition.

In another embodiment of this invention, a process of coating a substrate is provided comprising applying at least one primer layer, at least one basecoat composition layer, and at least one clearcoat layer to a substrate; wherein the clearcoat layer is applied when the basecoat composition layer is wet; and wherein the basecoat composition layer comprises a basecoat composition.

In another embodiment of this invention, a process of coating a substrate is provided comprising applying at least one primer layer, at least one basecoat composition layer, and at least one clearcoat layer to a substrate; wherein the basecoat composition is applied when the primer layer is wet; and wherein the clearcoat layer is applied when the basecoat composition is wet; and wherein the basecoat composition layer comprises a basecoat composition.

BRIEF DESCRIPTION OF THE DRAWINGS

FIG. 1 contains scans from a Laser Scanning Confocal Microscope of Control Example 3.1 and Inventive Examples 2.3 and 3.3.

DETAILED DESCRIPTION OF THE INVENTION

The present invention may be understood more readily by reference to the following detailed description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value.

Throughout this application, where patents or publications are referenced, the disclosures of these references in their entireties are intended to be incorporated by reference into this application provided they do not contradict the statements herein so as to more fully describe the state of the art to which the invention pertains.

As used throughout the disclosure, CAB means a cellulose acetate butyrate; CAP means a cellulose acetate propionate; and HS-CAB means an inventive high solids cellulose acetate butyrate according to the invention, having a high maximum degree of substitution, a low degree of polymerization, a low intrinsic viscosity (IV), and a low molecular weight.

Strike-in means the redissolve of the basecoat caused by the solvents in a clearcoat and typically results in a mottled or muddy appearance of the basecoat pigment/metal flakes. Strike-in can be measured by the relative change in Flop Index.

Flop means where two different painted panels appear to be a good match for color when viewed at a given angle, but appear different at all other angles.

High Solids Coatings are coatings with a higher % solids in the formulation than traditional coatings, this typically means coatings formulations with a solids level greater than or equal to 30%.

In one embodiment of the invention, a basecoat composition is provided comprising: a) at least one film-forming polymer selected from the group consisting of acrylic polyols and polyester polyols; b) at least one rheological modifier; c) at least one solvent; d) at least one pigment; e) optionally, at least one microgel; f) optionally, at least one crosslinking agent; and g) at least one cellulose mixed ester selected from:

(1) a cellulose mixed ester having:
  a total degree of substitution per anhydroglucose unit of from about 3.08 to about 3.50, having the following substitutions:
    a degree of substitution per anhydroglucose unit of hydroxyl of no more than about 0.70,
    a degree of substitution per anhydroglucose unit of $C_3$-$C_4$ esters from about 0.80 to about 1.40, and
    a degree of substitution per anhydroglucose unit of acetyl of from about 1.20 to about 2.34;
  an inherent viscosity of from about 0.05 to about 0.15 dL/g, as measured in a 60/40 (wt./wt.) solution of phenol/tetrachloroethane at 25° C.;
  a number average molecular weight ($M_n$) of from about 1,000 to about 5,600;
  a weight average molecular weight ($M_w$) of from about 1,500 to about 10,000; and
  a polydispersity of from about 1.2 to about 3.5;
(2) a cellulose mixed ester having:
  a total degree of substitution per anhydroglucose unit of from about 3.08 to about 3.50, having the following substitutions:
    a degree of substitution per anhydroglucose unit of hydroxyl of no more than about 0.70;
    a degree of substitution per anhydroglucose unit of $C_3$-$C_4$ esters from about 1.40 to about 2.45, and
    a degree of substitution per anhydroglucose unit of acetyl of from about 0.20 to about 0.80;
  an inherent viscosity of from about 0.05 to about 0.15 dL/g, as measured in a 60/40 (wt./wt.) solution of phenol/tetrachloroethane at 25° C.;
  a number average molecular weight ($M_n$) of from about 1,000 to about 5,600;
  a weight average molecular weight ($M_w$) of from about 1,500 to about 10,000; and a polydispersity of from about 1.2 to about 3, and
(3) a cellulose mixed ester having:
  a total degree of substitution per anhydroglucose unit of from about 3.08 to about 3.50, having the following substitutions:
    a degree of substitution per anhydroglucose unit of hydroxyl of no more than about 0.70;
    a degree of substitution per anhydroglucose unit of $C_3$-$C_4$ esters from about 1.40 to about 2.45, and
    a degree of substitution per anhydroglucose unit of acetyl of from about 0.20 to about 0.80;
  an inherent viscosity of from about 0.05 to about 0.15 dL/g, as measured in a 60/40 (wt./wt.) solution of phenol/tetrachloroethane at 25° C.;
  a number average molecular weight ($M_n$) of from about 1,000 to about 5,600;
  a weight average molecular weight ($M_w$) of from about 1,500 to about 10,000; and
  a polydispersity of from about 1.2 to about 3.5;
and mixtures of said cellulose mixed esters.

Cellulose mixed esters are described in U.S. Pat. No. 7,585,905, herein incorporated by reference to the extent it does not contradict the statements herein. In one embodiment, the cellulose mixed esters have a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 0.80 to about 1.40, and a degree of substitution per anhydroglucose unit of acetyl of from about 1.20 to about 2.34. According to this embodiment, the inventive cellulose mixed esters exhibit an inherent viscosity from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the ester may comprise butyryl, or propionyl, or mixtures of the two.

In various alternative aspects, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, an polydispersity may be from 1.2 to 2.5; an inherent viscosity from 0.07 to 0.11 dL/g; or a number average molecular weight ($M_n$) from about 1,000 to about 4,000. In certain other embodiments, an inherent viscosity may be from about 0.07 to about 0.11 dL/g; or a number average molecular weight ($M_n$) from about 1,000 to 4,000.

In a further embodiment, the cellulose mixed esters used in the basecoat composition have a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 1.40 to about 2.45, and a degree of substitution per anhydroglucose unit of acetyl of from 0.20 to about 0.80. According to this embodiment, the inventive mixed esters exhibit an inherent viscosity of from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the ester may comprise butyryl, or propionyl, or mixtures of the two.

In various alternative embodiments, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a polydispersity may be from 1.2 to 2.5; an inherent viscosity from 0.07 to 0.11 dL/g; or a number average molecular weight ($M_n$) from about 1,000 to about 4,000. In certain other embodiments, an inherent viscosity may be from about 0.07 to about 0.11 dL/g; and a number average molecular weight ($M_n$) from about 1,000 to 4,000.

In yet another embodiment, the invention relates to cellulose mixed esters having a total degree of substitution per anhydroglucose unit of from about 3.08 to about 3.50, and having the following substitutions: a degree of substitution per anhydroglucose unit of hydroxyl of no more than about 0.70; a degree of substitution per anhydroglucose unit of $C_3$-$C_4$ esters from about 2.11 to about 2.91, and a degree of substitution per anhydroglucose unit of acetyl of from 0.10 to about 0.50. According to this embodiment, the inventive mixed esters may exhibit an inherent viscosity of from about 0.05 to about 0.15 dL/g, as measured in a 60/40 (wt./wt.) solution of phenol/tetrachloroethane at 25° C.; a number average molecular weight ($M_n$) of from about 1,000 to about 5,600; a weight average molecular weight ($M_w$) of from about 1,500 to about 10,000; and a polydispersity of from about 1.2 to about 3.5. In various embodiments, the ester may comprise butyryl, or propionyl, or mixtures of the two.

In various alternative embodiments, the degree of substitution per anhydroglucose unit of hydroxyl may be from about 0.05 to about 0.70; the inherent viscosity may be from about 0.05 to about 0.12 dL/g, as measured in a 60/40 (wt./wt.) solution of phenol/tetrachloroethane at 25° C.; or the number average molecular weight ($M_n$) may be from about 1,500 to about 5,000. In certain embodiments, a polydispersity may be from 1.2 to 2.5; an inherent viscosity from 0.07 to 0.11 dL/g; and a number average molecular weight ($M_n$) from about 1,000 to about 4,000. In certain other embodiments, an inherent viscosity may be from about 0.07 to about 0.11 dL/g; and a number average molecular weight ($M_n$) from about 1,000 to 4,000.

The inventive esters may have an inherent viscosity of from about 0.05 to about 0.15 dL/g, or from about 0.07 to about 0.11 dL/g, as measured in a 60/40 (wt./wt.) solution of phenol/tetrachloroethane at 25° C. (as further defined below), and a maximum degree of substitution per anhydroglucose unit from about 3.08 to about 3.50, and a degree of substitution per anhydroglucose unit of organic esters, for example those having from 1 to 12 carbon atoms, preferably $C_2$-$C_4$ alkyl esters, and more preferably saturated $C_2$-$C_4$ alkyl esters, of about 2.38 to about 3.50.

These cellulose mixed esters are soluble in a wide range of solvents and solvent blends, as demonstrated in the examples contained in U.S. Pat. No. 7,585,903, which has been previously incorporated by reference, making them particularly suited for custom coating formulations. The cellulose mixed esters may be alkyl cellulose esters, such as methylcellulose, or hydroxyalkyl cellulose esters, such as methyl-hydroxypropyl cellulose esters. However, in some embodiments, the cellulose esters are esters that are not otherwise modified, i.e. the cellulose is modified only by the addition of organic ester functionality, not ether functionality or carboxyl functionality obtained via oxidation chemistry. Certain particular novel esters are preferred and further provided as additional embodiments of this invention.

In yet another embodiment, the cellulose mixed ester has a maximum degree of substitution of from about 3.08 to about 3.50, a degree of substitution per anhydroglucose unit of hydroxyl from about 0.01 up to about 0.70, a degree of substitution per anhydroglucose unit of $C_3$-$C_4$ esters of about 0.8 to about 3.50, a degree of substitution per anhydroglucose unit of acetyl from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from about 0.07 to about 0.11 dL/g, the degree of substitution per anhydroglucose unit of hydroxyl from 0.10 to 0.70, the degree of substitution per anhydroglucose unit of $C_3$-$C_4$ esters from 1.10 to 3.25, or the degree of substitution per anhydroglucose unit of acetyl from 0.05 to 0.90. Various esters according to this embodiment exhibit solubility in a wide range of solvents and solvent blends.

In another embodiment, the cellulose mixed ester has a maximum degree of substitution of from about 3.08 to about 3.50, a degree of substitution per anhydroglucose unit of hydroxyl from about 0.01 up to about 0.70, a degree of substitution per anhydroglucose unit of $C_3$-$C_4$ esters of about 0.8 to about 3.50, a degree of substitution per anhydroglucose unit of acetyl from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from about 0.07 to about 0.11 dL/g, the degree of substitution per anhydroglucose unit of hydroxyl about 0, the degree of substitution per anhydroglucose unit of $C_3$-$C_4$ esters from 2.60 to 3.40, or the degree of substitution per anhydroglucose unit of acetyl from 0.10 to 0.90. Various esters according to these embodiments exhibit solubility in a wide range of solvents and solvent blends.

In another embodiment of the present invention, the cellulose acetate butyrate has a maximum degree of substitution of from about 3.08 to about 3.50, and a degree of substitution per anhydroglucose unit of hydroxyl from about 0.01 to about 0.70, and a degree of substitution per anhydroglucose unit of butyryl of about 0.80 to about 3.44, and a degree of substitution per anhydroglucose unit of acetyl of about 0.05 to about 2.00, and having an inherent viscosity of 0.05 to 0.15 dL/g, as measured in a 60/40 (wt./wt.) solution of phenol/tetrachloroethane at 25° C. In various alternative embodiments, the inherent viscosity may be from 0.07 to 0.11 dL/g, the degree of substitution per anhydroglucose unit of hydroxyl from 0.10 to 0.70, butyryl from 1.10 to 3.25, or acetyl from 0.10 to 0.90. Various esters according to this embodiment exhibit solubility in a wide range of solvents and solvent blends.

As a further embodiment, the cellulose acetate propionate has a degree of substitution per anhydroglucose unit of hydroxyl from about 0.01 to about 0.70, and a degree of substitution per anhydroglucose unit of propionyl of about 0.80 to about 3.44 and a degree of substitution per anhydroglucose unit of acetyl of from about 0.05 to about 2.00, and having an inherent viscosity of about 0.05 to about 0.15 dL/g, as measured in a 60/40 (wt./wt.) solution of phenol/tetrachloroethane at 25° C. In various alternative embodiments, the inherent viscosity may be from 0.07 to 0.11 dL/g, the degree of substitution per anhydroglucose unit of hydroxyl from 0.10 to 0.70, the degree of substitution per anhydroglucose unit of propionyl from 1.10 to 3.25, or the degree of substitution per anhydroglucose unit of acetyl of from 0.10 to 0.90. Various esters according to this embodiment exhibit solubility in a wide range of solvents and solvent blends.

Different grades and sources of cellulose are available and are useful according to the invention, and can be selected from cotton linters, softwood pulp, hardwood pulp, corn fiber and other agricultural sources, and bacterial cellulose, among others. The source of cellulose used to prepare the cellulose mixed esters of the invention is important in providing a product having suitable properties. Generally, a dissolving-grade cellulose is used as starting material for preparing the cellulose mixed esters of this invention. In one embodiment, the dissolving-grade cellulose has an α-cellulose content of greater than 94%. Those skilled in the art will also recognize that the use of cellulose from different sources may require modifications to the reaction conditions (e.g. temperature, catalyst loading, time) in order to account for any differences in the reactivity of the cellulose.

In certain embodiments, the source of cellulose can be a natural cellulose as just described, and that the source of cellulose not be a modified cellulose such as a cellulose ether, e.g. an alkyl cellulose. Similarly, in certain embodiments, the cellulose starting material is not a carboxyalkylcellulose, such as carboxymethylcellulose, or any cellulose derivative having acid functionality. These cellulose derivatives are more expensive than the naturally-derived cellulose just described, and in many cases result in cellulose mixed esters that are less suitable for use in coating formulations, especially those containing appreciable amounts of organic solvents. It also follows that certain of the cellulose mixed esters used in the inventive basecoat compositions have an acid value no greater than about 5, or no greater than about 1.

The cellulose esters utilized in the basecoat compositions may be prepared by a multi-step process. In this process, cellulose is water-activated, followed by water displacement via solvent exchange with an alkanoic acid such as acetic acid, followed by treatment with a higher alkanoic acid (propionic acid or butyric acid) to give a cellulose activate wet with the appropriate alkanoic acid. Next, the cellulose activate is treated with the desired anhydride, in the presence of a strong acid catalyst such as sulfuric acid, to give essentially a fully-substituted cellulose ester having a lower molecular weight than conventional esters. A solution consisting of water and an alkanoic acid is added slowly to the anhydrous "dope" solution so as to allow removal of combined sulfur from the cellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the cellulose backbone. This product is then hydrolyzed using sulfuric acid to provide a partially substituted cellulose ester. Hydrolysis is important to provide gel-free solutions in organic solvents, and to provide better compatibility with other resins in coatings applications. The hydroxyl groups exposed during hydrolysis are also important crosslinking sites in many coatings applications.

Next, the sulfuric acid is neutralized after the esterification or hydrolysis reactions are complete by addition of a stoichiometric amount of an alkali or alkaline earth metal alkanoate, for example, magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of cellulose ester are isolated by diluting the final neutralized "dope" with an equal volume of acetic acid followed by precipitation of the diluted "dope" into a volume of water about 20 to 30 times its weight, to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

The key descriptors of the composition of a cellulose ester are the level of substitution of the various ester groups (i.e. degree of substitution or wt. % are commonly used and are discussed in detail in other parts of this application), the level of hydroxyl groups, and the size of the polymer backbone, which can be inferred from IV, viscosity, and GPC data. The key factors that influence the resulting composition of the cellulose mixed esters used in this invention are: acetic anhydride level, acetic acid level, butyric (or propionic) anhydride level, butyric (or propionic) acid level, water level, cellulose level, catalyst type, catalyst level, time, and temperature. One skilled in the art will appreciate that higher catalyst loadings, higher temperatures, and/or longer reaction times during esterification are used to produce the cellulose mixed esters, having lower molecular weights than conventional esters.

Thus, as a further aspect of the invention, the cellulose mixed esters may be prepared by a multi-step process. In the process according to the invention, cellulose is water-activated, followed by water displacement via solvent exchange with an alkanoic acid such as acetic acid, followed by solvent exchange with a higher alkanoic acid (e.g. propionic acid or butyric acid) to give a cellulose-activate wet with the appropriate alkanoic acid (e.g. propionic or butyric acid). In this regard, we have found that it is important that the starting cellulose has a 94 to 99% alpha content, preferably about 95 to 98% alpha cellulose content. The high alpha content is important for the quality of the final products prepared therefrom. We have found that low alpha cellulose pulps can lead to poor solubility in organic solvents and consequently to poor formulations.

Next, the activated cellulose is reacted with the desired anhydride in the presence of a strong acid catalyst such as sulfuric acid to give a fully substituted cellulose ester with a lower molecular weight than conventional esters. A solution containing water and an alkanoic acid or mixture of alkanoic acids is added slowly to the anhydrous "dope" solution so as to allow removal of combined sulfur from the cellulose backbone. The final addition allows a slow transition through the hydrous point to give a period of low water concentration and high temperature (as a result of the exotherm from water reacting with excess anhydride) in the reaction medium. This is important for hydrolysis of combined sulfur from the cellulose backbone. This product is then hydrolyzed using sulfuric acid to provide a partially-substituted cellulose ester. Hydrolysis is important to provide gel-free solutions in organic solvents, and to provide better compatibility with other resins in coatings applications.

Next, the sulfuric acid is neutralized after the esterification or hydrolysis reactions are complete by addition of a stoichiometric amount of an alkali or alkaline earth metal alkanoate, for example magnesium acetate, dissolved in water and an alkanoic acid such as acetic acid. Neutralization of the strong acid catalyst is important for optimal thermal and hydrolytic stability of the final product.

Finally, either the fully substituted or partially hydrolyzed forms of cellulose ester are isolated by diluting the final neutralized "dope" with an equal volume of acetic acid followed by precipitation of the diluted "dope" into a volume of water about 20 to 30 times its weight, to give a particle that can be easily washed with deionized water to efficiently remove residual organic acids and inorganic salts. In many cases, a fairly sticky precipitate is initially formed. The precipitate can be hardened by exchanging the precipitation liquid for fresh water and allowing the precipitate to stand. The hardened precipitate can then be easily washed and ground up as necessary.

In light of the present disclosure, those skilled in the art will readily appreciate that, of the process parameters just described, higher catalyst loadings, higher temperatures, and/or longer reaction times during esterification will be used to obtain the cellulose mixed esters having lower molecular weights than conventional cellulose esters, as further evidenced in the examples contained in U.S. Pat. No. 7,585,905, which has previously been incorporated by reference.

The cellulose mixed esters utilized in this invention have a weight average molecular weight, $M_w$, as measured by GPC, of from about 1,500 to about 10,000; or from about 2,000 to about 8,500; a number average molecular weight, $M_n$, as measured by GPC, of from about 1,500 to about 6,000; and a polydispersity, defined as $M_w/M_n$, from about 1.2 to about 7, or from about 1.2 to about 3.5, or from about 1.2 to about 2.5.

The cellulose mixed esters according to the invention, sometimes described herein as HS-CAB's, exhibit compatibility with a wide variety of co-resins, compatibility being defined as the ability of two or more resins, when mixed together, to form a stable homogeneous mixture useful as a coating composition. For example, an HS-CAB with approximately 38 wt. % butyryl (sometimes described herein as an HS-CAB-38) exhibits compatibilities with Eastman's Acrylamac 2328, Akzo Nobel's Microgel, Eastman's Duramac 2314, Bayer's Desmodur 3300, Rhodia's XIDT, and Bayer's Desmodur IL, equal to or better than commercial higher-butyryl-content samples such as CAB-551-0.01 (cellulose acetate butyrate containing approximately 55 wt. butyryl, available from Eastman Chemical Company). In some instances, cellulose mixed esters having approximately 38 wt. % butyryl, or approximately 55 wt. % butyryl, are compatible at a 1:1 ester to resin loading with acrylic resins that are not compatible with many conventional molecular weight cellulose esters. Such dramatic shifts in compatibility allow formulators to use a mid-butyryl ester (about 38 wt. %) in applications that might otherwise require a higher butyryl CAB for compatibility purposes.

An advantage to being able to use a mid-butyryl ester instead of a high-butyryl ester is that when all properties aside from butyryl level and acetyl level remain constant, i.e. hydroxyl value and molecular weight, the mid-butyryl CAB has a higher $T_g$ than its high-butyryl counterpart. Another advantage to using a mid-butyryl ester over a high-butyryl ester is that mid-butyryl commercial esters are often less soluble in particular solvents and solvent blends than their high-butyryl counterparts. This same trend is generally observed when comparing mid-butyryl HS-CAB's with high-butyryl HS-CAB's of equivalent molecular weight and hydroxyl content. Without being bound by theory, we believe that the observed solubility differences between mid-butyryl and high-butyryl esters is responsible in part for the improved redissolve resistance seen with certain of the inventive esters when a topcoat is applied to a basecoat. We believe that the combination of improved compatibility along with improved, but also differentiated, solubility will be a valuable asset to coatings formulation chemists.

Thus, conventional cellulose esters with a higher butyryl content tend to be more soluble and have a lower $T_g$ than their counterparts having lower butyryl levels. One result of increased solubility is that the redissolve resistance of the resulting coating is negatively affected. One of the key advantages of a conventional high butyryl cellulose ester such as cellulose acetate butyrate, CAB-551-0.01, produced by Eastman Chemical Company is its increased compatibility with many co-resins when compared with a mid-butyryl ester, such as, cellulose acetate butyrate, CAB-381-0.1, produced by Eastman Chemical Company. Surprising, we have found that inventive mid-butyryl esters (HS-CAB-38) according to the invention have better compatibility with co-resins than a conventional molecular weight high butyryl cellulose ester such as a CAB-551-0.01 produced by Eastman Chemical Company, while exhibiting a similar solubility. As a result, coatings formulators can use the inventive esters of the invention in basecoat formulations that cannot tolerate the viscosity increase imparted by the addition of conventional CAB's, while providing the redissolve resistance typical of conventional esters having a higher butyryl content.

As mentioned, the inventive mixed esters likewise demonstrate better-than-expected redissolve resistance in certain systems. This is surprising, since the inventive mixed esters have a molecular weight lower than conventional cellulose mixed esters. One would instead expect to see a decrease in redissolve resistance with a lowering in molecular weight. As a result, coatings formulators can use the inventive esters of the invention in basecoat formulations that cannot tolerate the viscosity increase imparted by the addition of conventional CAB's, while providing the necessary redissolve resistance.

Traditionally, cellulose esters are considered to have a maximum degree of substitution (DS) of 3.0. A DS of 3.0 indicates that there are 3.0 reactive hydroxyl groups in cellulose that can be derivatized. Native cellulose is a large polysaccharide with a degree of polymerization from 700-2,000, and thus the assumption that the maximum DS is 3.0 is approximately correct. However, as the degree of polymerization is lowered, the end groups of the polysaccharide backbone become relatively more important. In the cellulose mixed esters utilized in the basecoat compositions of this invention, this change in maximum DS influences the performance of the cellulose mixed esters, by changing the solubility in certain solvents and the compatibility with certain coatings resins.

Table 1 gives the $DS_{Max}$ at various degrees of polymerization (DP). Mathematically, a degree of polymerization of 401 is required in order to have a maximum DS of 3.00. As the table indicates, the increase in $DS_{Max}$ that occurs with a decrease in DP is slow, and for the most part, assuming a maximum DS of 3.00 is acceptable. However, once the DP is low enough, for example a DP of 21, then it becomes appropriate to use a different maximum DS for all calculations.

TABLE 1

Effect of DSMax on DP.

| DP | $DS_{Max}$ |
|---|---|
| 1 | 5.00 |
| 2 | 4.00 |
| 3 | 3.67 |
| 4 | 3.50 |
| 5 | 3.40 |
| 6 | 3.33 |
| 7 | 3.29 |
| 8 | 3.25 |
| 9 | 3.22 |
| 10 | 3.20 |
| 11 | 3.18 |
| 12 | 3.17 |
| 13 | 3.15 |
| 14 | 3.14 |
| 15 | 3.13 |
| 16 | 3.13 |
| 17 | 3.12 |
| 18 | 3.11 |
| 19 | 3.11 |
| 20 | 3.10 |
| 21 | 3.10 |
| 22 | 3.09 |
| 23 | 3.09 |
| 24 | 3.08 |
| 25 | 3.08 |
| 50 | 3.04 |
| 75 | 3.03 |
| 100 | 3.02 |
| 134 | 3.01 |
| 401 | 3.00 |

The cellulose mixed esters utilized in the inventive basecoat compositions have a high maximum degree of substitution and a low degree of polymerization.

The cellulose mixed esters utilized in the inventive basecoat compositions have a high maximum degree of substitution and a low degree of polymerization, unexpectedly exhibiting rheological performance similar to conventional cellulose esters having a much higher degree of polymerization. It is quite surprising that an HS-CAB with such a low degree of polymerization would display such rheological performance.

Without being bound by any theory, we believe that the cellulose esters utilized in the inventive basecoat compositions exhibit a fairly random substitution pattern of hydroxyl groups. We believe that this random substitution pattern of hydroxyl groups is achieved by performing the molecular weight reduction step prior to hydrolysis of the ester groups. The low molecular weight cellulose ester products of the prior art processes generally exhibit a non-random substitution pattern, particularly at C-4 of the non-reducing terminus and at C-1 (RT1) of the reducing terminus. The products of the prior art generally have a hydroxyl group at C-4 and either a hydroxyl or ester at C-1 (RT-1) depending on whether the process is a hydrolysis or an acetolysis reaction.

The widely accepted mechanism presented in Scheme 1 may help the reader to visualize the explanation above. The proposed mechanism presented in Scheme 1 depicts the reaction of a polysaccharide with a high degree of polymerization, the nature of the groups at C4 and RT1 being influenced by the amount of cleavage that occurs. The substitution at the two carbons of interest, C4 and RT1, increases to large levels as more and more glycosidic bonds are cleaved. Scheme 1 shows only a single glycosidic bond being cleaved and thus only one C4 and one RT1 site have the substitution pattern displayed by products generated by the prior art. As more and more sites are cleaved, the effect of the substitution pattern at C4 and RT1 becomes more important.

Processes used to prepare the cellulose mixed esters utilized in the inventive basecoat compositions result in a fully-esterified cellulose ester having approximately the desired degree of polymerization while the reaction mixture is still anhydrous (i.e. before hydrolysis). As a result, the hydrolysis of esters during the preparation of the products of this invention is believed to produce essentially a random distribution of hydroxyl groups throughout the entire cellulosic backbone. This belief is based, in part, on the unique solubility profiles exhibited by the esters according to the invention. Those skilled in the art will recognize that under kinetically controlled conditions, hydrolysis will occur preferentially at certain sites (e.g. C6>>C2>C3). The hydrolysis process practiced in this invention is performed under thermodynamic control (i.e. under equilibrium conditions), which is believed to result in a more random distribution of hydroxyl functionality throughout the cellulosic backbone.

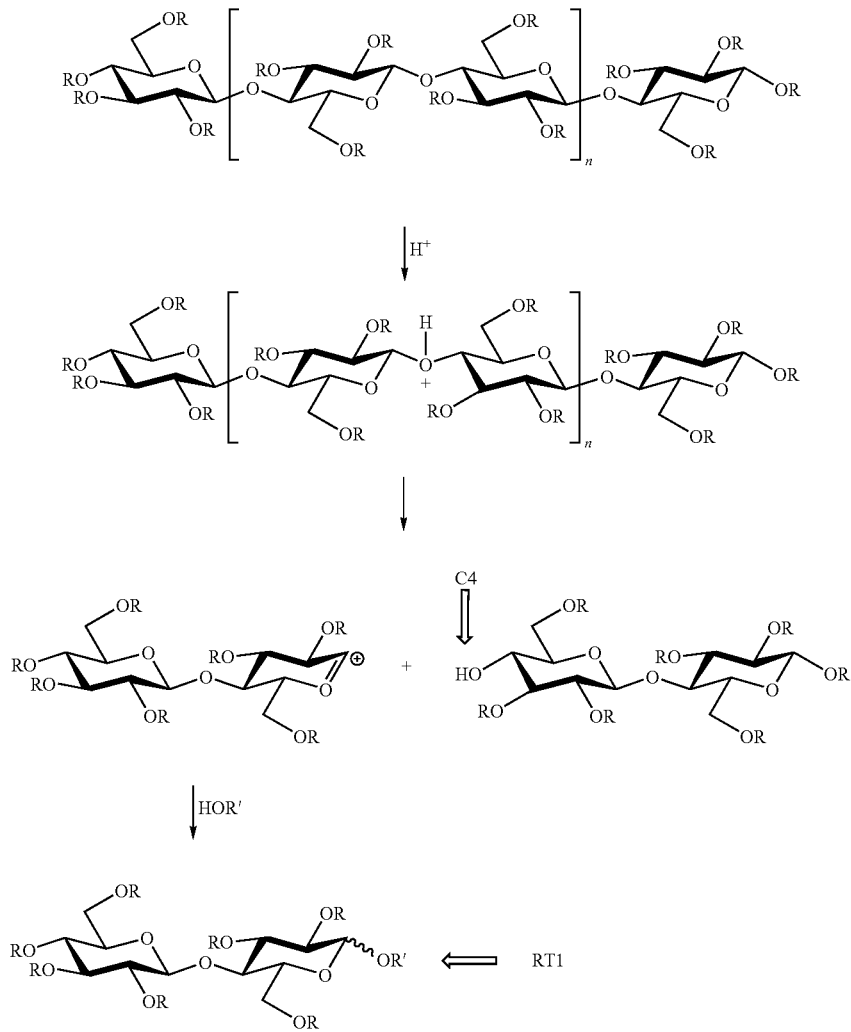

Scheme 1. Proposed mechanism for the hydrolysis and acetolysis of glycosidic bonds.

$^{13}$C-NMR studies suggest that the cellulose mixed esters utilized in the inventive basecoat compositions (HS-CAB's) have a different substitution pattern than those made by processes in which molecular weight is reduced during hydrolysis. The chemical structure below highlights the areas where differences in the substitution patterns are believed to occur.

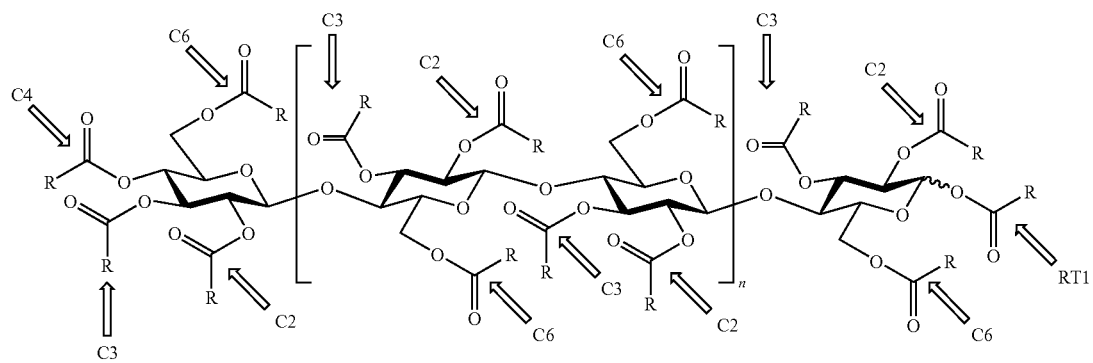

The cellulose mixed esters are easily formulated into the basecoat compositions where they are used as rheology modifiers and/or binder components providing improved aluminum flake orientation and improved hardness. They can provide a water-clear, high gloss, protective coating for a variety of substrates, especially metal and wood.

The cellulose mixed esters are soluble in most classes of typical coating solvents, including ketones, esters, alcohols, glycol ethers, and glycol ether esters, while tolerating dilution with water or aromatic hydrocarbons.

Examples of typical solvents in which the cellulose mixed esters exhibit solubility include acetone, methyl ethyl ketone, methyl isobutyl ketone, methyl amyl ketone, methyl propyl ketone, 2-propoxyethanol, 2-butoxyethanol, ethyl 3-ethoxypropionate, ethanol, methanol isopropyl alcohol, diacetone alcohol, ethylene glycol monobutyl ether acetate, ethyl acetate, propyl acetate, isopropyl acetate, butyl acetate, isobutyl acetate diethylene glycol ethyl ether, Eastman PM acetate (propylene glycol methyl acetate), Eastman EB acetate (ethylene glycol butyl acetate), Eastman PM Solvent (propylene glycol monomethyl ether), Eastman DM Solvent (diethylene glycol methyl ether), Eastman PB Solvent (propylene glycol monobutyl ether, Eastman DE Solvent (diethylene glycol ethyl ether), Eastman PP Solvent (propylene glycol monopropyl ether), Eastman EP Solvent (ethylene glycol monopropyl ether), Eastman EB Solvent (ethylene glycol monobutyl ether), Eastman 95% Tecsol C (ethanol with methanol, MIBK and ethyl acetate as denaturants with 5% water), N-methylpyrrolidone, Eastman EEP Solvent (ethyl 3-ethoxypropionate), and other volatile inert solvents typically used in coating compositions. For example, organic solutions of the cellulose mixed esters can be prepared by adding 1 to 1000 parts of solvent per part of ester; 1.5 to 9 parts of solvent per part of ester is preferred.

The cellulose esters utilized in the basecoat compostions are effective flow additives. Addition of the cellulose esters to the basecoat compositions generally results in the elimination of surface defects in the film upon curing/drying (i.e. elimination of pinholing and orange peel). A distinct advantage that high $DS_{Max}$, low DP cellulose esters have over conventional cellulose esters is that the inventive esters have a minimal impact on solution and/or spray viscosity when added to high solids coatings formulations. The percent solids can be increased, thus reducing the VOC of the formulation. Conventional cellulose esters can be used in these same applications as flow additives, but a reduction in solids must generally accompany the addition of the conventional cellulose esters. That is, the solvent level must be increased so as to maintain a desirable viscosity.

In one embodiment of the invention, the cellulose mixed ester has a 29% Butyryl (Bu) and a 1.5% OH content. The amount of cellulose mixed ester contained in the basecoat composition can range from about 0.5 wt % to about 50 wt % based on the weight of the film-forming polymer solids. Other ranges are from about 5 wt % to about 40 wt % and from about 10 wt % to about 25 wt %.

The film-forming polymer can be any that is known in the art. In one embodiment of the invention, the film-forming polymer is at least one film-forming polymer selected from the group consisting of acrylic polyols, polyester polyols, alkyds, polyurethanes, cellulosics, and waxes. The amount of the film-forming polymer can range from about 5% by weight to about 90% by weight based on the weight of the basecoat composition. Another range is from about 20% by weight to about 50% by weight based on the weight of the basecoat composition.

The rheological modifier can be any that is known in the art capable of changing the flow and leveling of a coating composition. Rheological modifiers include flow additives, such as waxes. The amount of the rheological modifier can range from about 0.1% to about 3% based on the weight of the film-forming polymer solids.

The solvent can be any that is known in the art for producing coating compositions. Solvents have been previously described in this disclosure. In one embodiment of this invention, the solvent is at least one organic solvent selected from the group consisting of esters, ester alcohols, ketones, aliphatic and aromatic hydrocarbons, glycol ethers, glycol ether esters, and alcohols. If in powder form, the coating composition can be utilized as a powered coating composition. The amount of solvent can range from about 1% by weight to about 99% by weight.

The pigment utilized in this embodiment of the coating composition can be any that is known in the art used in basecoat compositions. Pigments are discussed subsequently in this disclosure. In one embodiment of the invention, aluminum flake is utilized as a pigment.

The microgel utilized in this embodiment of the basecoat composition can be any known in the art. Microgels are non-aqueous dispersions that can either contain alcohol or be alcohol free. The amount of microgel contained in the basecoat composition can range from about 10% by weight to about 40% by weight based on the weight of the film-forming polymer solids. Commercial examples of microgels include Microgel 10-1300 produced by Akzo Nobel and R-1623-M3 produced by Coroc.

Optionally, the basecoat composition can also contain at least one crosslinking agent. In one embodiment of the invention, the crosslinking agent comprises at least one selected from the group consisting of isocyanates, melamines, and epoxies. Such melamines are preferably compounds having a plurality of —N(CH$_2$OR)$_2$ functional groups, wherein R is C$_1$-C$_4$ alkyl, preferably methyl. In general, the melamine cross-linking agent may be selected from compounds of the following formula, wherein R is independently C$_1$-C$_4$ alkyl:

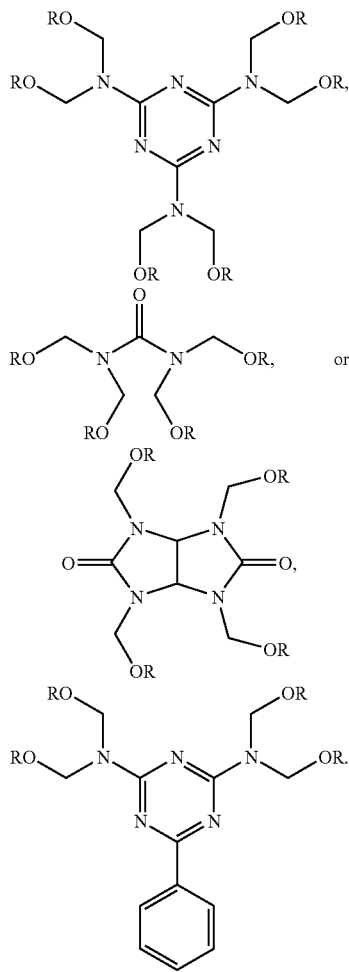

In this regard, preferred cross-linking agents include hexamethoxymethylamine, tetramethoxymethylbenzo-guanamine, tetramethoxymethylurea, mixed butoxy/methoxy substituted melamines, and the like. The most preferred melamine cross-linking agent is hexamethoxymethylamine.

Typical isocyanate crosslinking agents and resins include hexamethylene diisocyanate (HMDI), isophorone diisocyanate (IPDI), and toluene diisocyanate.

The amount of crosslinking agent may vary depending on the film-forming polymer utilized. The amount of crosslinking agent can range from about 5 weight percent to about 40 weight percent based on the total weight of cellulose mixed ester and film-forming polymer, or from about 10 weight percent to about 30 weight percent.

Any substrate material can be coated with the basecoat composition according to the present invention. These include surfaces, such as, but not limited to, glass, ceramic, paper, wood and plastic. The basecoat composition of the present invention is particularly adapted for metal substrates and specifically for use in a basecoat application, such as aluminum or steel. Various blends of substrates can also be coated, for example, polypropylene, polycarbonate, polyesters, such as polyethylene terephthalate, acrylic sheeting, as well as other solid substrates. The coating may be applied using conventional spray equipment such as air-atomized guns or electrostatic bell applicators.

The relatively high Tg (110° C.) coupled with the low butyryl content enables the cellulose mixed ester to provide performance benefits very similar to conventional cellulose acetate butyrates without causing a detrimental effect on the VOC levels. The incorporation of low molecular weight cellulose mixed esters in high-solids basecoats at additive levels (up to 10% on film-forming polymer solids) resulted in significant improvements in strike-in resistance and the overall appearance of the coating. These inventive basecoat compositions are particularly suited for used by Original Equipment Manufacturer (OEM) products in order to improve appearance and yet reduce VOC emissions.

The solvent can be any that is known in the art for producing coating compositions. Solvents have been previously described in this disclosure. In one embodiment of this invention, the solvent is at least one selected organic solvent selected from the group consisting of esters, ester alcohols, ketones, aliphatic and aromatic hydrocarbons, glycol ethers, glycol ether esters, and alcohols. If in powder form, the coating composition can be utilized as a powered coating composition.

It is recognized that additional additives can be used in the previously described compositions, including the following: flow additives, leveling additives, wetting and dispersing agents, defoamers, adhesion promoters, slip aids, anti-skinning agents, UV stabilizers, biocides, mildewcides, fungicides, pigments, and others.

The solvent can be an organic solvent or a solvent mixture.

In another embodiment of this invention, a method of for producing the basecoat composition is provided. The method comprises contacting at least one film-forming polymer, at least one rheological modifier, at least one solvent, at least one pigment, optionally at least one microgel, optionally at least one crosslinking agent, and at least one cellulose mixed ester to produce the basecoat composition. The components can be contacted in any order to produce the basecoat compositions.

In another embodiment of the invention, a method for coating a substrate is provided. The method comprises contacting at least one film-forming polymer, at least one rheological modifier, at least one solvent, at least one pigment, optionally at least one microgel, optionally at least one crosslinking agent, and at least one cellulose mixed ester to produce the basecoat composition; and applying the basecoat composition to the substrate.

In another embodiment of the invention, a process of coating a substrate is provided. The process comprises applying at least one primer layer, at least one inventive basecoat composition layer, and at least one clearcoat layer to a substrate; wherein the inventive basecoat composition layer is applied when the primer layer is wet.

In another embodiment of the invention, a process of coating a substrate is provided. The process comprises applying at least one primer layer, at least one inventive basecoat composition layer, and at least one clearcoat layer to a substrate; wherein the clearcoat layer is applied when the inventive basecoat composition layer is wet.

In another embodiment of the invention, a process of coating a substrate is provided. The process comprises applying at least one primer layer, at least one inventive basecoat composition layer, and at least one clearcoat layer to a substrate; wherein the inventive basecoat composition is applied when the primer layer is wet; and wherein the clearcoat layer is applied when the inventive basecoat composition is wet.

As used in this disclosure, the term "wet" means in the liquid state e.g. not dry. The term "wet" includes when the coating is tacky to the touch. In one embodiment of the invention, the primer layer can be applied in more than one coat. In another embodiment of the invention, the basecoat composition layer can be applied in more than one coat. In another embodiment of the invention, the clearcoat layer can be applied in more than one coat. In another embodiment of the invention, the time between multiple coats of primer, basecoat, or clearcoat is about 1 minute.

In one embodiment of the invention, the time between applying the primer layer and the basecoat layer is a minimum of 2 minutes. In another embodiment of the invention, the time between applying the primer layer and the basecoat layer is 4 minutes or more.

In one embodiment of the invention, the time between the basecoat composition and clearcoat a minimum of 2 minutes. In another embodiment of the invention, the time between applying the basecoat layer and the clear coat layer is 4 minutes or more.

The low molecular weight cellulose mixed ester contained in the inventive basecoat composition helps to prevent the primer from mixing with the basecoat composition and from the basecoat composition from mixing with the clearcoat.

In another embodiment, the coated substrate is routed to a curing zone. The curing zone can contain at least one oven. In one embodiment of the invention, the time between clearcoat layer application and routing to the curing zone is a minimum of about 5 minutes. In another embodiment, the amount of time if from about 7 to about 10 minutes. The oven temperature can range from about 150° F. to about 200° F. for a minimum of 5 minutes, which can be followed by a 10 minute cure at about 285° F.

In another embodiment of the invention, a process for coating a substrate is provided comprising: a) applying a primer to said substrate to produce a primed substrate; b) applying a basecoat composition to said primed substrate while said primer is wet to produce a basecoated substrate; and c) applying a clearcoat composition to said basecoated substrate while said basecoat composition is wet and optionally said primer is wet to produce a coated substrate.

In one embodiment of the invention, the time between primer

As a further aspect of the present invention, the above compositions are further comprised of one or more coatings additives. Such additives are generally present in a range of about 0.1 to 15 weight percent, based on the total weight of the composition. Examples of such coatings additives include leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of additional coatings additives can be found in Raw Materials Index, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark Syloid™; polypropylene, available from Hercules Inc., under the trademark Hercoflat™; synthetic silicate, available from J. M Huber Corporation under the trademark Zeolex™; and polyethylene.

Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all are available from BYK Chemie U.S.A. under the trademark Anti Terra™. Further examples include polysiloxane copolymers, polyacrylate solution, cellulose esters, hydroxyethyl cellulose, hydrophobically modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRUBREAK of Buckman Laboratories Inc., under the BYK™ trademark of BYK Chemie, U.S.A., under the Foamaster™ and NOPCO™ trademarks of Henkel Corp./Coating Chemicals, under the Drewplus™ trademark of the Drew Industrial Division of Ashland Chemical Company, under the Troysol™ and Troykyd™ trademarks of Troy Chemical Corporation, and under the SAG™ trademark of Union Carbide Corporation.

Examples of fungicides, mildewcides, and biocides include 4,4-dimethyloxazolidine, 3,4,4-trimethyl-oxazolidine, modified barium metaborate, potassium N-hydroxymethyl-N-methyldithiocarbamate, 2-(thiocyano-methylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trade name Cyasorb UV, and available from Ciba Geigy under the trademark TINUVIN, and diethyl-3-acetyl-4-hydroxy-benzyl-phosphonate, 4-dodecyloxy-2-hydroxy benzophenone, and resorcinol monobenzoate.

In the present disclosure, the following terms have the given meanings:

As used in the examples and throughout the application, MEK means methyl ethyl ketone; MPK means methyl propyl ketone; MAK means methyl amyl ketone; PM acetate or Eastman PM acetate means propylene glycol methyl acetate; EB acetate or Eastman EB acetate means ethylene glycol butyl acetate; PM or Eastman PM means propylene glycol monomethyl ether; DM or Eastman DM means diethylene glycol methyl ether; PB or Eastman PB means propylene glycol monobutyl ether; DE or Eastman DE means diethylene glycol ethyl ether; PP or Eastman PP means propylene glycol monopropyl ether; EP Solvent or Eastman EP Solvent means ethylene glycol monopropyl ether; EB Solvent or Eastman EB Solvent means ethylene glycol monobutyl ether; Tecsol C, 95% means ethanol with methanol, MIBK and ethyl acetate as denaturants with 5% water; NMP means n-methyl pyrrolidone; and EEP Solvent or Eastman EEP Solvent means ethyl 3-ethoxypropionate.

EXAMPLES

Test Methods

Flop Index Procedure:

Flop index measurements were taken using an X-Rite model MA86II Multi-angle spectrophotometer. The instrument was calibrated with supplied calibration standards prior to sample evaluation. A three reading average was taken on each sample and reported.

Dry Film Thickness Procedure:

Dry film thickness measurements were taken using an ETG electronic film thickness gauge. Prior to sample analysis, the calibration was verified using factory standards provided with the instrument. A three reading average was taken and reported for each sample. Care was taken to evaluate, as close as possible, the same area in which flop index measurements were taken.

Non-Volatile Weight Determination:

A 1-2 gram quantity of each sample was carefully weighed into an aluminum weighing dish. Initial weight of the pan and corresponding sample weight were recorded. Samples were then allowed to flash or air dry for 5 minutes and placed in forced air oven (285° F.) for 30 minutes. The pans were then removed from oven, allowed to cool to room temperature, and weighed. Each sample was tested in duplicate. Non-volatile weight was calculated and reported in percent.

Spray Viscosity:

A #4 Ford cup was used to determine spray viscosity. The viscosity is reported in seconds.

Laser Scanning Confocal Microscopy:

A Zeiss model LSM510 reflection laser scanning confocal microscope (LSCM) was employed to characterize the surface morphology (topographic profile). The incident laser wavelength was 543 nm. By moving the focal plane, single images (optical slices) can be combined to build up a three dimensional stack of images that can be digitally processed. Z-steps were selected to obtain overlapping optical slices (a stack of z-scan images). LSCM images presented in this invention report are 2-D intensity projections (an image formed by summing the stack of images over the z direction).

Wave-Scan Dual Meter

A Wave-Scan Dual Meter obtained from Qualitest North America located in Fort Lauderdale, Fla. was utilized to evaluate the appearance of the panels sprayed with the inventive basecoat composition.

TABLE 1

Spray Application Parameters Used in the Examples:

| | Basecoat 1 | Basecoat 2 | Clearcoat 1 | Clearcoat 2 |
|---|---|---|---|---|
| Bell Speed (×1000 rpm) | 70 | 70 | 45 | 45 |
| Shape Air (psi) | 25 | 17 | 29 | 29 |
| E-Stat (kV) | 75 | 75 | 70 | 70 |
| Pump Rate (Hz) | 38 | 20 | 48.6 | 48.6 |
| Robot Speed (mm/s) | 600 | 600 | 500 | 500 |
| Fan Width (inches) | 12 | 12 | 12 | 12 |
| Standoff Distance (inches) | 10 | 10 | 10 | 10 |
| Offset | 192 mm | 90 mm | 192 mm | 90 mm |
| Travel | Horizontal | Horizontal | Horizontal | Horizontal |
| Pattern Type | 50% L | 50% L | 50% L | 50% L |
| Flash between Basecoats | 90 sec | | | |
| Flash $BC^1$ to $CC^2$ | | 6 min | | |
| Flash between Clearcoats | | | 90 sec | |
| Flash CC to oven | | | | 7 min |

[1]BC = Basecoat
[2]CC = Clearcoat
Note:
Two basecoat passes or layers by the paint spraying equipment were conducted followed by two clearcoat passes or layers.

Commercial Material Utilized for Examples

Setalux 16-1173 Polyester Polyol and Setamine US-138 BB-70 melamine crosslinking agent manufactured by Nuplex Resins
DPA cellulose mixed esters manufactured by Eastman Chemical Company
Ceratix 8461 wax manufactured by BYK Additives and Instruments
Sparkle Ultra 6555 aluminum flake manufactured by Siberline
BYK-358N Flow Additive manufactured by BYK Additives and Instruments
Microgel 10-1300 manufactured by Akzo Nobel.
Stapa Metalux 2156 manufactured by Eckart Effect Pigments
Coroc Microgel R-1623 manufactured by Cooks Composite Products

Example 1

The purpose of this experiment was to identify the type of low molecular weight cellulose mixed ester that could be used as a performance additive to improve brightness and overall appearance in high-solids OEM basecoat systems.

TABLE 2

Formulated high solids basecoats containing different grades (% butyryl) of Eastman Developmental Performance Additives (DPA) (cellulose mixed esters)

| Basecoat composition Components | Control Example 1.1 No DPA | Inventive Example 1.2 No MG1/10 wt % DPA-38 | Inventive Example 1.3 No MG/10 wt % DPA-33 | Inventive Example 1.4 No MG/10 wt % DPA-29 |
|---|---|---|---|---|
| Setalux 16-1173 Polyester Polyol (film-forming polymer) (60 wt % total solids) | 105 | 89 | 89 | 89 |
| Setamine US-138 BB-70 Melamine Crosslinking Agent (70% $TS^3$) | 38.6 | 38.6 | 38.6 | 38.6 |
| DPA-38 38% butyryl (50 wt % in $SB^2$) (mixed cellulose ester) | 0 | 18 | 0 | 0 |
| DPA-33 33% butyryl (50 wt % in $SB^2$) | 0 | 0 | 18 | 0 |
| DPA-29 29% butyryl (50 wt % in $SB^2$) | 0 | 0 | 0 | 18 |
| Ceratix 8461 (wax) (5 wt %) (rheological modifier) | 40 | 40 | 40 | 40 |

TABLE 2-continued

Formulated high solids basecoats containing different grades
(% butyryl) of Eastman Developmental Performance Additives (DPA)
(cellulose mixed esters)

| | | | | |
|---|---|---|---|---|
| Silberline Sparkle Ultra 6555 (flake) (75% TS[3]) | 13.4 | 13.4 | 13.4 | 13.4 |
| BYK-358N Flow Additive (52 wt %) | 1 | 1 | 1 | 1 |
| Solvent Blend | 13.4 | 13.4 | 13.4 | 13.4 |
| total(g): | 211.4 | 213.4 | 213.4 | 213.4 |
| Additional Solvent Blend to get 18s #4Ford Cup | 57 | 48 | 52 | 52 |
| Solids as Prepared (%): | 48.53 | 48.53 | 48.53 | 48.53 |
| Application Viscosity (#4 Ford Cup) | 18.2 | 18.2 | 18.3 | 18 |
| Theoretical Solids (%): | 36.7 | 37.1 | 36.6 | 36.6 |
| Measured Solids (%) at application: | 35.37 | 35.48 | 35.54 | 35.17 |
| Density (lb/G) | 8.17 | 8.15 | 8.18 | 8.16 |

| Solvent Blend: | Vol % | ml |
|---|---|---|
| Aromatic 100[4] | 20 | 300 |
| n-Pentyl Propionate | 30 | 450 |
| n-Butyl Alcohol | 10 | 150 |
| N-Butyl Acetate | 40 | 600 |
| | 100 | 1500 |

[1]MG—microgel
[2]SB—solvent blend
[3]TS—total solids
[4]Aromatic 100 - light acromatic hydrocarbon solvent (CAS#64742-95-6)

Low molecular weight cellulose esters with different butyryl contents (38 wt %, 33 wt % and 29 wt %) were included in the experiments. Basecoat compositions were prepared containing 10 wt % mixed cellulose ester based on total film-forming polymer solids (Table 2).

The order of addition of the different ingredients during sample preparation was as follows: acrylic polyol polymer, melamine resin, flow additives, wax, solvent blend, microgel (MG), aluminum flake slurry, and DPA (mixed cellulose ester) solution. The aluminum flake was supplied as a paste and reduced in a solvent blend prior to being added to the formula. Also, the wax component was placed on a paint shaker for 5 minutes prior to addition to ensure homogeneity. Each sample was covered during sample preparation with aluminum foil to minimize solvent evaporation. About 800 ml of the formulated basecoat composition were used for electrostatic bell application in a robotic spray booth. A commercial OEM clearcoat was used in this example. The basecoat composition was applied at 27 s (Ford Cup #4 viscosity) and had a non-volatile content of 51%. The target dry film thickness (DFT) was 0.7-0.8 .mils (about 20 microns) for the basecoat composition and 1.6-1.7 (about 35-40 microns) mils for the clear coat.

TABLE 3

Flop Index Values of Spray Applied Basecoat Compositions (Avg. of 3 values)

| | | Flop Index | | Strike-In |
|---|---|---|---|---|
| Sample Number | Description | Basecoat only | Basecoat + Clearcoat | Δ Flop Index |
| Control Example 1.1 | No DPA | 15.3 | 5.6 | −9.70 |
| Control Example 1.1A | No DPA | 15.1 | 5.52 | −9.58 |
| Inventive Example 1.2 | No MG[1]/10 wt % DPA-38 | 14.2 | 7.2 | −7.00 |
| Inventive Example 1.3 | No MG/10 wt % DPA-33 | 14.6 | 10.6 | −4.00 |
| Inventive Example 1.4 | No MG/10 wt % DPA-29 | 14.5 | 14.25 | −0.25 |

[1]MG—Microgel

Note that Control Example 1.1A is the same as Control Example 1.1 except another test panel was coated with the same basecoat composition.

'Strike-in' can be measured by the relative change in Flop Index (Δ FI) between the basecoat composition versus the basecoat composition with the addition of the clearcoat. A lower value of Δ FI indicates a greater barrier to strike-in or redissolve behavior. From Table 3, it can be clearly seen that although the initial flop index numbers (basecoat only) were comparable, panels sprayed with DPA-29 cellulose mixed ester containing basecoat compositions provided the highest strike-in resistance to the subsequent layer of clearcoat.

Example 2

The purpose of this experiment was to demonstrate an improvement in strike-in (redissolve resistance) and overall appearance in samples formulated with DPA-29 mixed cellulose ester as previously described. The formulation details are provided in Table 4. About 800 ml of the formulated basecoat composition were used for electrostatic bell application in a robotic spray booth. A commercial OEM clearcoat was used in this example. The basecoat composition was applied at 27 s (Ford Cup #4 viscosity) and had a non-volatile content of 51%. The target dry film thickness (DFT) was 0.7-0.8 .mils (about 20 microns) for the basecoat composition and 1.6-1.7 (about 35-40 microns) mils for the clear coat.

TABLE 4

Formulated High Solids Basecoat Compositions

| Material | Control 2.1 Control | Inv. 2.2 Akzo MG/DPA | Inv. 2.3 Coroc MG/DPA | Control 2.4 Akzo MG only | Control 2.5 Coroc MG only | Inv. 2.6 DPA-29 only |
|---|---|---|---|---|---|---|
| Setal16-1173 Polyester Polyol (Nuplex) (60 wt % TS[1]) | 52.5 | 32.0 | 32.0 | 41.0 | 41.0 | 44.5 |
| Setamin US-138 Melamine Crosslinking Agent (Nuplex) (70 wt % TS) | 19.3 | 19.3 | 19.3 | 19.3 | 19.3 | 19.3 |
| Eastman DPA 29% butyryl (50 wt % in SB[2]) | 0.0 | 9.0 | 9.0 | 0.0 | 0.0 | 9.0 |
| Ceratix8461 wax (BYK-Cera) (5 wt %) | 20.0 | 20.0 | 20.0 | 20.0 | 20.0 | 20.0 |
| Akzo Microgel 10-1300 (Nuplex) (50 wt %) | 0.0 | 12.5 | 0.0 | 12.5 | 0.0 | 0.0 |
| Coroc R-1623-M3 microgel (CCP) 50 wt % | 0.0 | 0.0 | 12.5 | 0.0 | 12.5 | 0.0 |
| Eckart Stapa Metalux2156 metal flake (75 wt % TS) | 6.7 | 6.7 | 13.4 | 6.7 | 6.7 | 6.7 |
| BYK-358N leveling additive (52 wt %) | 0.5 | 0.5 | 0.5 | 0.5 | 0.5 | 0.5 |
| *Solvent Blend (see below) | 6.7 | 6.7 | 6.7 | 6.7 | 6.7 | 6.7 |
| Total (g) | 105.7 | 106.7 | 113.4 | 106.7 | 106.7 | 106.7 |
| Solids (%) as prepared | 51.3 | 49.7 | 54.8 | 50.6 | 50.6 | 51.0 |
| (g) Solvent Blend- ~17 (s) Ford | 30 | 25 | 25 | 28 | 25 | 28 |
| Total (g): | 135.7 | 131.7 | 138.4 | 134.7 | 131.7 | 134.7 |
| Wt/Gallon | 8.13 | 8.11 | 8.14 | 8.05 | 8.13 | 8.14 |
| VOC (g/L) | 643 | 633 | 643 | 644 | 645 | 648 |
| Theoretical Solids | 37.80 | 37.74 | 39.60 | 37.56 | 38.42 | 37.86 |
| Measured Solids | 34.06 | 34.92 | 34.14 | 33.34 | 33.86 | 33.69 |
| #4 Ford(s) | ~17 | ~17 | ~17 | ~17 | ~17 | ~17 |

| Solvent Blend Composition: | Volume % |
|---|---|
| Aromatic 100 | 20 |
| n-pentyl propionate | 30 |
| n-butyl alcohol | 10 |
| n-butyl acetate | 40 |
| total: | 100 |

[1]TS—total solids
[2]SB—solvent blend

Appearance data from the spray application trials of formulated high solids basecoat compositions for Control Examples 2.1 and 2.5 and Inventive 2.2, 2.3, and 2.6 are shown in Table 5. The aluminum flakes used in the formulation were Eckart Stapa Metallux 2156.

TABLE 5

| | | Flop Index Values | | |
|---|---|---|---|---|
| Data: | Description | Basecoat only | Basecoat + Clearcoat | Δ Flop |
| Control 2.1 | Control | 10.2 | 6.5 | −3.7 |
| Inventive 2.2 | Akzo MG + DPA | 9.71 | 7.1 | −2.61 |
| Inventive 2.3 | Coroc MG + DPA | 11.4 | 8.7 | −2.7 |
| Control 2.5 | Coroc MG | 11.6 | 8.1 | −3.5 |
| Inventive 2.6 | DPA 29 | 9.91 | 7.2 | −2.71 |

Example 3

The formulations in this current example are shown in Table 5. These basecoat compositions used a different grade of aluminum flakes. The experiments were conducted to ensure that the choice of flakes/pigments had no impact on the performance benefits of mixed cellulose esters in the basecoat formulation. The commercial clearcoat mentioned in Example 1, was used in this case as well.

TABLE 6

Formulated High Solids Basecoat Compositions Using Silberline Sparkle Ultra 6555 Aluminum Flakes

| | Control 3.1 Control No MG/No DPA | Inv. 3.2 No MG/ 10 wt % DPA-2386 | Inv. 3.3 10 wt % DPA-2386/ 12 wt % C-MG[3] | Control 3.4 12 wt % C-MG |
|---|---|---|---|---|
| Setal 16-1173 Polyester Polyol(60 wt % TS[1]) | 1491 | 1254 | 900 | 1197 |
| Setamine US-138 BB-70 Melamine Crosslinking Agent (70 wt % TS) | 549 | 540 | 540 | 540 |
| DPA 29 29% Butyryl (50 wt % in SB[2]) | 0 | 252 | 252 | 0 |
| Ceratix 8461 wax (5 wt %) | 600 | 561 | 561 | 561 |
| Coroc Microgel R-1623 (50 wt %) | 0 | 0 | 351 | 351 |

TABLE 6-continued

Formulated High Solids Basecoat Compositions Using
Silberline Sparkle Ultra 6555 Aluminum Flakes

| | | | | |
|---|---|---|---|---|
| Silberline Sparkle Ultra 6555 metal flake(75 wt % TS) | 189 | 189 | 189 | 189 |
| BYK-358N leveling additive (52 wt %) | 15 | 15 | 15 | 15 |
| Solvent Blend | 156 | 189 | 192 | 147 |
| total (g): | 3000 | 3000 | 3000 | 3000 |
| Additional Solvent Blend to get 20s #4Ford Cup | 616.2 | 614.7 | 502.9 | |
| Solids as Prepared (%): | 48.62 | 47.8 | 46.57 | 48.31 |
| Application Viscosity (#4 Ford Cup) | 19.7 | 19.6 | 19.7 | |
| Theoretical Solids (%): | 40.3 | 39.7 | 39.9 | 39.3 |
| Measured Solids (%) at application: | 36.23 | 36.04 | 36.53 | 36.41 |
| Density (lb/Gallon) | 8.17 | 8.16 | 8.18 | |

| Solvent Blend: | Vol % | ml |
|---|---|---|
| Aromatic 100 | 20 | 300 |
| n-Pentyl Propionate | 30 | 450 |
| n-Butyl Alcohol | 10 | 150 |
| N-Butyl Acetate | 40 | 600 |
| total: | 100 | 1500 |

[1]TS—Total Solids
[2]SB—Solvent Blend
[3]C-MG—Coroc Microgel

The spray application parameters were also identical to those described in the Example 1. It can be clearly seen from both the examples that the addition of DPA 2386 cellulose mixed ester with 29 wt % butyryl content at 10 wt % based on film-forming polymer solids did not cause any appreciable change in the non-volatile content of the basecoat composition.

Appearance data from the spray application trials of formulated high solids basecoats for Control Example 3.1 and Inventive Examples 3.2-3.4. The aluminum flakes used in the formulation was Silberline Sparkle Ultra 6555. A Wave-Scan Dual Meter was utilized to evaluate the appearance of the sprayed panels. The data are shown in Table 7. The Combined Ford Value (CF) was determined which is a value given by the Wave-Scan Dual Meter of the overall appearance of the panel. The higher the value, the better the appearance of the panel. The Long Wavelength (LW) and Short Wavelength (SW) Data is a measure of the surface topography of the panel. The lower the value, the more smooth the surface of the panel. Distinctness of Image (DOI) is a measure of the clarity of the panel.

TABLE 7

| | Basecoat | | | | | | | Flop Index | |
|---|---|---|---|---|---|---|---|---|---|
| Sample Number | Description | Clearcoat | CF | LW | SW | DOI | BC | BC/CC | Δ Flop |
| Control 3.1 | Control | 1 | 25.00 | 22.40 | 34.50 | 69.60 | 9.68 | 7.15 | −2.53 |
| Inventive 3.2 | No MG/ 10 wt % DPA-2386 | 1 | 46.40 | 8.60 | 24.70 | 79.60 | 10.87 | 10.05 | −0.82 |
| Inventive 3.3 | 10% DPA-2386/12 wt % C-MG | 1 | 42.60 | 7.60 | 21.20 | 77.70 | 13.89 | 13.48 | −0.41 |
| Inventive 3.4 | 12 wt % C-MG | 1 | 32.60 | 15.50 | 30.50 | 76.10 | 8.35 | 6.52 | −1.83 |

[1]CF—Combined Ford Value
[2]LW—Long Wavelength
[3]SW—Short Wavelength
[4]DOI—Distinctness of Image
[5]BC—Basecoat only
[6]BC/BC—Basecoat and Clearcoat
Commercial OEM Clearcoat
Total Solids: 49.6
Application Viscosity: 26.5 s The inventive examples 3.2-3.4 show better appearance data having a higher Combined Ford Value and lower Long Wavelength and Short Wavelength data than the Control Example 3.1.

Results and Discussion of Examples

The appearance data from Examples 1, 2 & 3 indicate the presence of cellulose mixed esters in the high solids basecoat compositions had a positive effect in increasing the 'strike-in' resistance as well as improving the overall appearance (CF) of the coating. 'Strike-in' can be measured by the relative change in Flop Index (Δ FI) between the basecoat versus the basecoat+clearcoat. Formulations containing DPA 2386 cellulose mixed esters showed the lowest Δ FI values. The Strike-In (Δ Flop Index) for Inventive Examples 1.2-1.4 were lower than Control Example 1.1, therefore showing a greater barrier to redissolve behavior.

Example 4

Laser Scanning Confocal Microscopy can provide a fast non-destructive technique for correlating the overall appearance of the coating with its microstructure. Investigation of the coating microstructure using LSCM revealed that incorporation of DPA 2386 cellulose mixed esters to the formulation resulted in significant differences in the alignment and the distribution of the aluminum flakes. The images generated from analysis of the coatings are shown in FIG. 1. The individual flakes are better aligned normal to the surface and form overlapping interleaving structures in samples that contain DPA 2386 cellulose mixed esters. It is this alignment/angular orientation that leads to superior reflective properties and better appearance. The irregular orientation and distribution of flakes in the control system on the other hand results in the formation of dark regions. This causes diffuse scattering from internal surfaces of misaligned flakes and thereby a poorer appearance.

It is also very important to note that the incorporation of DPA 2386 cellulose mixed esters in the OEM basecoat formulation at 10 wt % based on film-forming polymer solids did not have a detrimental effect on the non-volatile content of the coating at spray viscosity.

Microgels have often been used as a competitive technology to conventional cellulose esters in terms of providing similar performance benefits. However, in this study, it was clearly seen that microgels did not provide much stand alone benefits like flake alignment or improved redissolve resistance. However, there may be a synergistic effect of having both the microgel and DPA 2386 in the basecoat formulation as evidenced by the highest FI numbers for Inventive Example 3.3.

In the drawings and specification, there have been disclosed typical preferred embodiments of the invention and, although specific terms are employed, they are used in a generic and descriptive sense only and not for purposes of limitation, the scope of the invention being set forth in the following claims.

We claim:

1. A basecoat composition comprising: a) at least one film-forming polymer selected from the group consisting of acrylic polyols and polyester polyols; b) at least one rheological modifier; c) at least one solvent; d) at least one pigment; e) optionally, at least one microgel; f) optionally, at least one crosslinking agent; and g) at least one cellulose mixed ester selected from:

(1) a cellulose mixed ester having:
a total degree of substitution per anhydroglucose unit of from 3.08 to about 3.50, having the following substitutions:
a degree of substitution per anhydroglucose unit of hydroxyl of no more than about 0.70,
a degree of substitution per anhydroglucose unit of $C_3$-$C_4$ esters from about 0.80 to about 1.40, and
a degree of substitution per anhydroglucose unit of acetyl of from about 1.20 to about 2.34;
an inherent viscosity of from 0.05 to 0.15 dL/g, as measured in a 60/40 (wt./wt.) solution of phenol/tetrachloroethane at 25° C.;
a number average molecular weight ($M_n$) of from about 1,000 to about 5,600;
a weight average molecular weight ($M_w$) of from about 1,500 to about 10,000; and
a polydispersity of from about 1.2 to about 3.5;

(2) a cellulose mixed ester having:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_3$-$C_4$ esters from about 1.40 to about 2.45, and
a degree of substitution per anhydroglucose unit of acetyl of from about 0.20 to about 0.80;
an inherent viscosity of from 0.05 to 0.15 dL/g, as measured in a 60/40 (wt./wt.) solution of phenol/tetrachloroethane at 25° C.;
a number average molecular weight ($M_n$) of from about 1,000 to about 5,600;
a weight average molecular weight ($M_w$) of from about 1,500 to about 10,000; and
a polydispersity of from about 1.2 to about 3, (3) a cellulose mixed ester having:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_3$-$C_4$ esters from about 1.40 to about 2.45, and
a degree of substitution per anhydroglucose unit of acetyl of from about 0.20 to about 0.80;
an inherent viscosity of from 0.05 to 0.15 dL/g, as measured in a 60/40 (wt./wt.) solution of phenol/tetrachloroethane at 25° C.;
a number average molecular weight ($M_n$) of from about 1,000 to about 5,600;
a weight average molecular weight ($M_w$) of from about 1,500 to about 10,000; and
a polydispersity of from about 1.2 to about 3.5;
and mixtures of said cellulose mixed esters.

2. The basecoat composition according to claim 1, wherein the $C_3$-$C_4$ ester comprises butyryl, and wherein the cellulose mixed ester forms a clear solution as a 10 weight percent mixture in at least one solvent selected from the group consisting of propylene glycol monomethyl ether, propylene glycol methyl acetate, diethylene glycol methyl ether, and mixtures thereof.

3. The basecoat composition according to claim 1, wherein the $C_3$-$C_4$ ester comprises propionyl.

4. The basecoat composition according to claim 1, wherein the degree of substitution per anhydroglucose unit of hydroxyl is from about 0.05 to about 0.70.

5. The basecoat composition according to claim 1 wherein the inherent viscosity is from 0.05 to about 0.12 dL/g, as measured in a 60/40 (wt./wt.) solution of phenol/tetrachloroethane at 25° C.

6. The basecoat composition according to claim 1, wherein the number average molecular weight ($M_n$) is from about 1,500 to about 5,000.

7. The basecoat composition according to claim 1, wherein the polydispersity is from 1.2 to 2.5.

8. The basecoat composition according to claim 1, wherein the $C_3$-$C_4$ ester comprises butyryl, and wherein the cellulose mixed ester exhibits a viscosity no greater than 6,000 centipoise as a 50 wt. % solution in a 90/10 by weight mixture of n-butyl acetate/xylene.

9. The basecoat composition according to claim 1, wherein the $C_3$-$C_4$ ester comprises butyryl, and wherein the cellulose mixed ester forms a clear solution as a 10 weight percent mixture in at least one solvent selected from the group consisting of C-11 ketone, diisobutyl ketone, propylene glycol monopropyl ether, ethylene glycol monopropyl ether, ethylene glycol monobutyl ether, methanol, toluene, and 90/10 by weight isopropyl alcohol/water blend.

10. The basecoat composition according to claim 1 wherein said film-forming polymer comprises at least one selected from the group consisting of acrylic polyols, polyester polyols, and alkyds.

11. The basecoat composition according to claim 1 wherein the amount of cellulose mixed ester ranges from about 1% by weight to about 20% by weight based on the weight of said basecoat composition.

12. A shaped or formed article coated with the basecoat composition of claim 1.

13. A process of coating a substrate comprising applying at least one primer layer, at least one basecoat composition layer, and at least one clearcoat layer to a substrate; wherein said basecoat composition layer is applied when the primer layer is wet; wherein said basecoat composition layer comprises a basecoat composition according to claim 1.

14. A process of coating a substrate comprising applying at least one primer layer, at least one basecoat composition layer, and at least one clearcoat layer to a substrate; wherein the clearcoat layer is applied when said basecoat composition layer is wet; and wherein said basecoat composition layer comprises a basecoat composition according to claim 1.

15. A process of coating a substrate comprising applying at least one primer layer, at least one inventive basecoat composition layer, and at least one clearcoat layer to a substrate; wherein said basecoat composition is applied when the primer layer is wet; and wherein said clearcoat layer is applied when said basecoat composition is wet; and wherein said basecoat composition layer comprises a basecoat composition according to claim 1.

\* \* \* \* \*